(12) United States Patent
Park et al.

(10) Patent No.: US 8,723,642 B2
(45) Date of Patent: May 13, 2014

(54) APPARATUS AND SYSTEM FOR PROVIDING WIRELESS CHARGING SERVICE

(75) Inventors: Jinmoo Park, Seoul (KR); Inchang Chu, Seoul (KR); Jaesung Lee, Gangwon-Do (KR)

(73) Assignee: LG Electronics Inc., Seoul (KR)

( * ) Notice: Subject to any disclaimer, the term of this patent is extended or adjusted under 35 U.S.C. 154(b) by 165 days.

(21) Appl. No.: 13/250,271

(22) Filed: Sep. 30, 2011

(65) Prior Publication Data

US 2012/0268238 A1    Oct. 25, 2012

(30) Foreign Application Priority Data

Apr. 25, 2011  (KR) .................. 10-2011-0038424

(51) Int. Cl.
*G05B 19/00* (2006.01)

(52) U.S. Cl.
USPC ............ 340/5.8; 320/107; 320/108; 320/103; 455/343.1; 455/573; 455/41.2

(58) Field of Classification Search
CPC .......... H02J 7/00; H02J 7/006; H02J 7/0021; H02J 7/0026; H02J 7/0029; H02J 2007/0098; H02J 17/00; H02J 5/005; H02J 7/025; G07F 15/006; B60L 11/182
USPC ............... 340/5.1, 5.2, 5.21, 5.22, 5.23, 5.24, 340/5.25, 5.4, 5.6, 5.61, 5.52, 5.8, 5.81, 340/5.82, 636.2; 705/34, 412; 320/106, 320/110, 114, 115, 135; 455/343.1, 41.2, 455/573
See application file for complete search history.

(56) References Cited

U.S. PATENT DOCUMENTS

| 2009/0174365 | A1* | 7/2009 | Lowenthal et al. ........... 320/109 |
| 2010/0036773 | A1 | 2/2010 | Bennett |
| 2011/0062230 | A1* | 3/2011 | Ward et al. .................... 235/377 |
| 2011/0279226 | A1* | 11/2011 | Chen et al. ..................... 340/5.8 |

* cited by examiner

*Primary Examiner* — Nabil Syed
(74) *Attorney, Agent, or Firm* — Birch, Stewart, Kolasch & Birch, LLP

(57) ABSTRACT

A wireless charging apparatus and system according to an embodiment of the present invention provides a wireless charging service through authentication so as to efficiently control charging rights with respect to a plurality of electronic devices, which desire to receive the wireless charging service using a shared wireless charging apparatus, resulting in allowing a user to get a stable wireless charging service and proposing a new benefit creation model. The wireless charging apparatus according to an embodiment of the present invention includes a wireless communication unit configured to receive authentication result information relating to a target electronic device from a server, and a wireless charging unit configured to wirelessly transmit power to the target electronic device if the authentication result information indicates a successful authentication, wherein the wireless communication unit transmits the authentication result information to the target electronic device if the authentication result information indicates an unsuccessful authentication.

12 Claims, 22 Drawing Sheets

| ITEM | | FIRST ELECTRONIC DEVICE | | SECOND ELECTRONIC DEVICE | |
|---|---|---|---|---|---|
| POWER RESIDUAL | MINIMUM POWER REQUIREMENT | 11% | 10% | 19% | 20% |
| WIRELESS DATA TRAFFIC | | 30Mb/day | | 50Mb/day | |
| URGENT CHARGING | | YES | | NO | |

APPARATUS AND SYSTEM FOR PROVIDING WIRELESS CHARGING SERVICE

This application claims the benefit of Korean Patent Application No. 10-2011-0038424, filed on Apr. 25, 2011, which is hereby incorporated by reference for all purposes as if fully set forth herein.

BACKGROUND OF THE INVENTION

1. Field of the Invention

This specification relates to an electronic device, and particularly, to a wireless charging apparatus and system.

2. Background of the Invention

As portability is required more and more for various electronic devices belonging to users, importance of battery efficiency is gradually increasing. Accordingly, various approaches to make the battery highly efficient have been introduced. However, further progress in battery charging has not been made in spite of those approaches or attempts for enhancement of the battery efficiency.

Especially, in order to charge different electronic devices, power adaptors suitable for the respective electronic devices should be individually provided, which causes users to feel inconvenient. Many researches for wireless charging of electronic devices have been in progress in recent time. The wireless charging is an innovative energy transfer concept, capable of transferring energy in an electromagnetic manner without a line for charging.

SUMMARY OF THE INVENTION

Therefore, an aspect of the detailed description is to provide a wireless charging apparatus and system, capable of providing a user with a stable wireless charging service by efficiently controlling charging rights for a plurality of electronic devices, which desire to receive a wireless charging service using a shared wireless charging apparatus, by way of providing the wireless charging service through authentication, and simultaneously proposing a new benefit creation model to providers.

Another aspect of the detailed description is to provide a wireless charging apparatus and system, capable of providing a user with an efficient wireless charging service for a plurality of electronic devices, which belong to the user and desire to receive the wireless charging service, by setting charging priorities of the plurality of electronic devices based upon power information under a limited wireless charging environment.

To achieve these and other advantages and in accordance with the purpose of this specification, as embodied and broadly described herein, a wireless charging apparatus can include a wireless communication unit configured to receive authentication result information relating to a target electronic device from a server having a database, and a wireless charging unit configured to wirelessly transmit power to the target electronic device if the authentication result information indicates a successful authentication. In addition, the wireless communication unit transmits the authentication result information to the target electronic device if the authentication result information indicates an unsuccessful authentication.

In one embodiment, the wireless communication unit can receive identification information from the target electronic device and request the authentication result information from the database stored in a server based upon the identification information.

In one embodiment, the wireless charging unit can receive identification information from the target electronic device, and the wireless communication unit can request the authentication result information from the server based upon the identification information.

In one embodiment, the wireless communication unit can request payment information from the target electronic device.

In one embodiment, the wireless communication unit can receive the requested payment information from the target electronic device and transmit the received payment information to the server.

In one embodiment, the wireless communication unit can receive approval information in response to the payment information from the server and transmit the received approval information to the target electronic device.

In one embodiment, the wireless communication unit can receive account information related to the target electronic device from the server, and the wireless charging unit can wirelessly transmit power to the target electronic device based upon the received account information.

In one embodiment, the wireless communication unit can receive the authentication result information related to the target electronic device from the server when the target electronic device is located within an area allowing a wireless power reception.

In one embodiment, the wireless communication unit can receive the authentication result information related to the target electronic device from the server when the target electronic device is located within an area, the area not allowing a wireless power reception.

In one embodiment, the wireless communication unit can receive the authentication result information related to the target electronic device from the server when the target electronic device is located within an area allowing a wireless data transmission and reception.

To achieve these and other advantages and in accordance with the purpose of this specification, as embodied and broadly described herein, a wireless charging apparatus can include a wireless communication unit configured to receive power information from first and second electronic devices, respectively, a controller configured to decide one of the first and second electronic devices as a target electronic device based upon the power information relating to the respective first and second electronic devices, and a wireless charging unit configured to wirelessly transmit power to the target electronic device.

In one embodiment, the power information can include at least one of power state information and power control information related to an associated electronic device.

In one embodiment, the power state information can include power residual information and minimum power requirement information for wireless communication, both related to an associated electronic device.

In one embodiment, the power state information can include information related to wireless data traffic of an associated electronic device.

In one embodiment, the power control information can further include information related to urgent charging or non-urgent charging of an associated electronic device.

In one embodiment, the controller can monitor whether or not the wireless charging unit stops the wireless power transmission to the target electronic device, and if the transmission stop is monitored, decide the other one, except for the target electronic device, of the first and second electronic devices as a new target electronic device.

To achieve these and other advantages and in accordance with the purpose of this specification, as embodied and broadly described herein, a wireless charging system can include a power receiving apparatus configured to wirelessly transmit identification information to a power transmitting apparatus via a power channel or a data channel, and a power transmitting apparatus configured to transmit an authentication request for the power receiving apparatus to a server based upon the identification information, receive authentication result information from the server, wirelessly transmit power to the power receiving apparatus via the power channel if the authentication result information indicates a successful authentication, and transmit the authentication result information to the power receiving apparatus via the data channel if the authentication result information indicates an unsuccessful authentication.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings.

DETAILED DESCRIPTION OF THE INVENTION

Figure 1:
FIG. 1 is an view schematically showing a wireless charging apparatus and an electronic device in accordance with embodiments.

Technical terms used in this specification are used to merely illustrate specific embodiments, and should be understood that they are not intended to limit the present disclosure. As far as not being defined differently, all terms used herein including technical or scientific terms can have the same meaning as those generally understood by an ordinary person skilled in the art to which the present disclosure belongs, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

A singular representation can include a plural representation as far as it represents a definitely different meaning from the context. Terms 'include' or 'has' used herein should be understood that they are intended to indicate an existence of several components or several steps, disclosed in the specification, and it can also be understood that part of the components or steps can not be included or additional components or steps can further be included.

A suffix "module" or "unit" used for constituent elements disclosed in the following description is merely intended for easy description of the specification, and the suffix itself does not give any special meaning or function.

An electronic device described in this specification can be comprehensively construed as any portable electronic device, which can include a mobile phone, a cellular phone, a smart phone, a personal digital assistants (PDA), a personal multimedia player (PMP), a tablet, multimedia equipment and the like.

It can be easily understood by a person skilled in the art that the configurations according to the embodiments of this specification are applicable to stationary terminals, such as digital TV, desktop computer and the like, unless limited to applying to a terminal.

It will be understood that, although the terms first, second, etc. can be used herein to describe various elements, these elements should not be limited by these terms. These terms are only used to distinguish one element from another. For example, a first element could be termed a second element, and, similarly, a second element could be termed a first element, without departing from the scope of the present disclosure.

Embodiments of the present invention will be described below in detail with reference to the accompanying drawings where those components are rendered the same reference number that are the same or are in correspondence, regardless of the figure number, and redundant explanations are omitted.

In describing the present invention, if a detailed explanation for a related known function or construction is considered to unnecessarily divert the gist of the present invention, such explanation has been omitted but would be understood by those skilled in the art. The accompanying drawings are used to help easily understood the technical idea of the present invention and it should be understood that the idea of the present invention is not limited by the accompanying drawings. The idea of the present invention should be construed to extend to any alterations, equivalents and substitutes besides the accompanying drawings.

FIG. 1 is an view schematically showing a wireless charging apparatus and an electronic device in accordance with embodiments.

As shown in FIG. 1, an electronic device 200 is allowed for wireless charging. Accordingly, the electronic device 200 can receive wireless power from the charging apparatus 100 to charge or recharge a battery.

The charging apparatus 100 can employ at least one of an electromagnetic induction type using an electromagnetic induction phenomenon and a magnetic resonance type of transferring power using a specific frequency.

The induction type wireless charging is a technique for wirelessly transmitting power using primary and secondary coils, namely, indicates a wireless charging using an electromagnetic induction principle that current is induced from one coil to another coil by a magnetic field.

The magnetic resonance type charging is to match a resonant frequency of a charging apparatus with a resonant frequency of an electronic device such that energy can be transferred from the charging apparatus to the electronic device.

Meanwhile, the electronic device 200 and the charging apparatus 100 can be spaced apart from each other by a specific distance. As such, since the charging apparatus 100 and the electronic device 200 have the specific distance d therebetween without contact with each other, various electronic devices can be charged or recharged at the same time, unlike the related art.

Hereinafter, description will be given of configurations of a charging apparatus and an electronic device upon employing an electromagnetic induction mechanism.

Figure 2A:
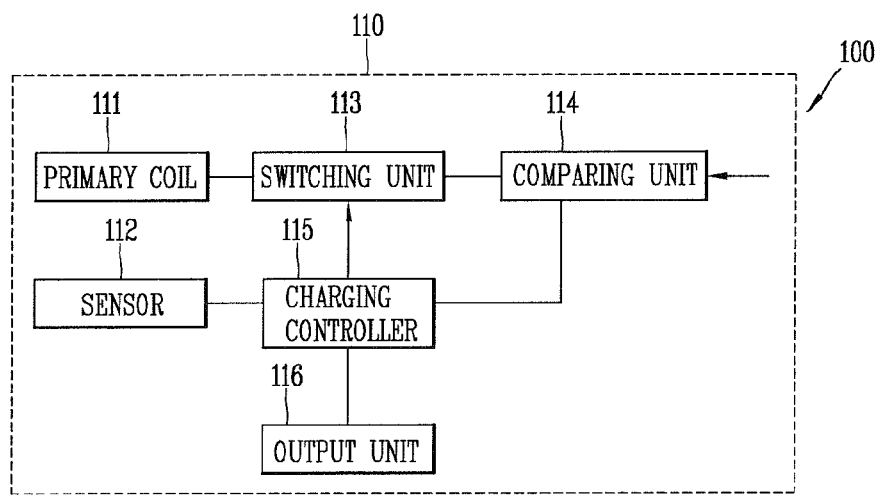
FIGS. 2A and 2B are block diagrams exemplarily showing configurations of an electromagnetic induction type charging apparatus 100 and an electronic device 200 applicable to the embodiments.
Figure 2B:
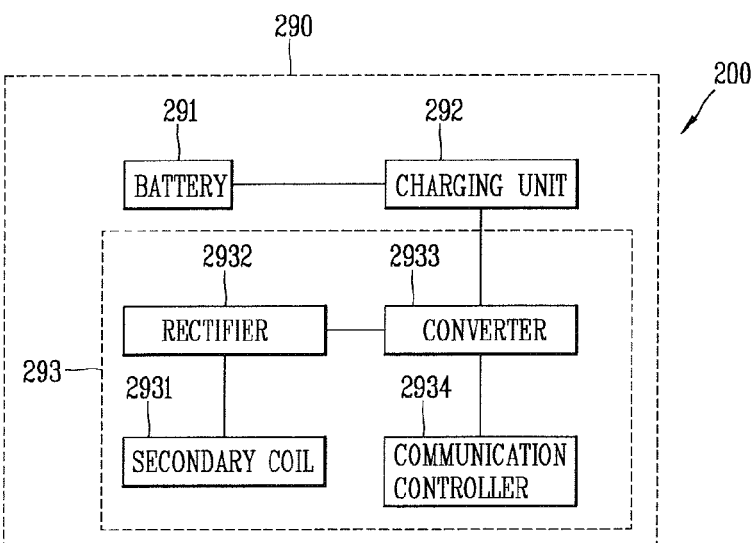

FIGS. 2A and 2B are block diagrams exemplarily showing configurations of an electromagnetic induction type charging apparatus 100 and an electronic device 200 applicable to the embodiments.

First, referring to FIG. 2A, the charging apparatus 100 can charge a battery of the electronic device 200 using an induced current. The electronic device 200, as will be explained later, can be a mobile communication terminal (for example, mobile phone, cellular phone) or a multimedia device. When the electronic device is a mobile terminal will be described with reference to FIG. 10.

The charging apparatus 100 is an apparatus for wirelessly charging a battery of the electronic device 100, namely, a power transmitter for transmitting power required for the battery charging.

The charging apparatus 100 can include an electromagnetic induction type charging unit 110. The electromagnetic induction type charging unit 110 can include a primary coil 111, a sensor 112, a switching unit 113, a comparing unit 114, a charging controller 115 and an output unit 116.

The primary coil 111 can generate an electromagnetic field in response to power applied. The primary coil 111 can be implemented as a solenoid. Also, an electromagnetic field generated from the primary coil 111 can induce a magnetic field on a secondary coil 2931 of the electronic device 200, thereby generating an induced current on the secondary coil 2931.

The sensor 112 can detect a contact with the electronic device 200 when the electronic device 200 is placed on the charging apparatus 100, and recognize the position of the electronic device 200 on the charging apparatus 100.

The sensor 112 can allow the electronic device 200 to be aligned on a position with the highest charging efficiency when the electronic device 200 is placed on the charging apparatus 100. When the electronic device 200 is placed on the charging apparatus 100, the highest charging efficiency can be obtained when a center of the primary coil 111 is in alignment with a center of the secondary coil 2931.

Therefore, to make the center of the primary coil 111 of the charging apparatus 100 be in alignment with the center of the secondary coil 2931 of the electronic device 200, a magnet can be installed in the center of the primary coil 111. Accordingly, when the center of the secondary coil 2931 is approached within a preset radius based on the center of the primary coil 111, the magnet can attract the electronic device 200 by its magnetic force such that the centers of the primary coil 111 and the secondary coil 2931 can be in alignment with each other.

Here, if a distance between the centers of the primary coil 111 and the secondary coil 2931 gets out of an allowed error range D, the charging apparatus 100 recognizes it as the electronic device 200 fails to meet an alignment condition, so it can transmit a signal to the electronic device 200 to indicate an unable wireless charging.

That is, when the centers of the primary coil 111 and the secondary coil 2931 overlap with each other, if the distance between the centers thereof does not meet the alignment condition, the charging apparatus 100 can not permit the wireless charging for a battery of the electronic device 200. Here, the charging apparatus 100 can transmit information relating to a direction and distance that the center of the secondary coil 2931 is misaligned with the center of the first primary coil 111 to the electronic device 200.

The switching unit 113 can serve to supply external power to the primary coil 111 or cut the supplied external power off according to the control of the charging controller 115.

The comparing unit 114 can function to check a normal or abnormal operation of the charging apparatus 100. The comparing unit 114 can detect a voltage or current of external power, and check whether or not the detected voltage or current exceeds a threshold value. The comparing unit 114 can include a resistance for detecting the voltage or current of the external power and a comparer for comparing the detected power voltage value or current value with a threshold value to output the comparison result.

For example, the comparing unit 114 checks whether or not the external power exceeds 5V and outputs the checked result to the charging controller 115. When the external power exceeds 5V, then the charging controller 115 controls the switching unit 113 to block power applied to the secondary coil 2931.

The charging controller 115 can control the switching unit 113 according to the checked result sent from the comparing unit 114. The charging controller 114 can also perform communications with the electronic device 200 so as to check a charging state of the battery. For example, the charging controller 115 can check the charging state of the battery 216 by performing a short-range communication, such as Bluetooth, with the electronic device 200.

Also, the charging apparatus 100 can charge a plurality of electronic devices at the same time.

In other words, two or more electronic devices can be placed on the charging apparatus 100 at the same time for charging, and the electronic devices can be different types of devices. For example, when a mobile terminal, a multimedia player, PDA and the like are simultaneously placed on the charging apparatus 100, they can all experience the wireless charging.

The output unit 116 can display the charging state according to the control of the charging controller 115. The output unit 116 can be a light-emitting diode and/or LCD.

Referring to FIG. 2B, the electronic device 200 can include a power supply unit 290. The power supply unit 290 can include a battery 291, a charging unit 292 and a wireless power receiving unit 293.

The wireless power receiving unit 293 can function to receive an induced current generated in the charging apparatus 100.

The wireless power receiving unit 293 can include a secondary coil 2931, a rectifier 2932, a converter 2933 and a communication controller 2934.

The secondary coil 2931 can generate an induced current in response to the changes in an electromagnetic field generated from the primary coil 111 of the charging apparatus 100. That is, the secondary coil 2931 can generate an induced current in response to reception of the induced current generated from the primary coil 111 of the charging apparatus 100.

The rectifier 2932 can be an alternating current (AC)-direct current (DC) converter for converting the induced current received via the secondary coil 2931 into DC power (or DC voltage).

The converter 2933 can convert DC power output from the rectifier 2932 into a particular voltage. That is, the converter 2933 can function to convert the DC power into a voltage appropriate for battery charging. For example, if the DC power output via the rectifier 2932 is 9V, the converter 2933 converts 9V into 5V.

The communication controller 2934 can perform communications with the charging apparatus 100. The communication controller 2934 can request an authentication from the charging apparatus as to whether a corresponding electronic device is a chargeable device or not. Upon the authentication request, the communication controller 2934 can transmit identification information, such as device number of the battery or the like, to the charging apparatus 100.

The charging unit 292 can charge the battery 291 using the induced current received via the secondary coil 2931. In other words, the charging unit 292 can supply the induced current, which is generated from the secondary coil 2931 by an electromagnetic field induction occurred in a charging pad, to the battery 291. The charging unit 292 can include a charging circuit for controlling battery charging, and an anti-overcurrent/overvoltage circuit for preventing overcurrent and overvoltage.

Hereinafter, description will be given of configurations of a magnetic resonance type charging apparatus and an electronic device with reference to FIG. 3.

Figure 3A:
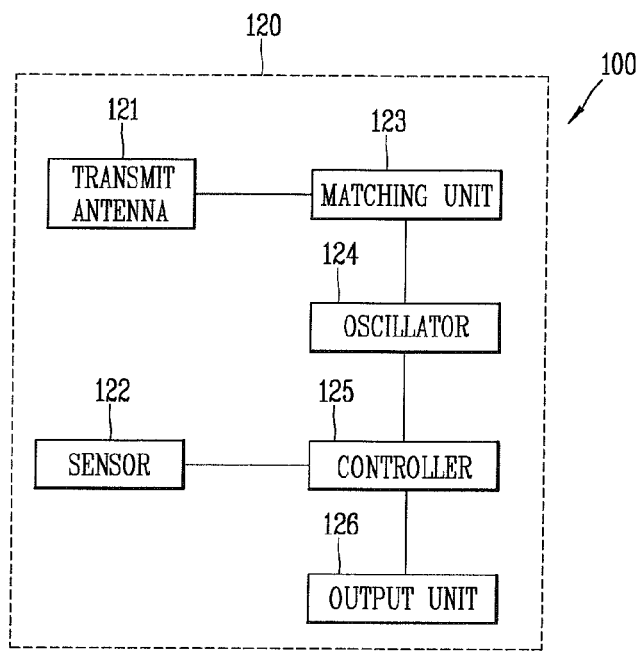
FIGS. 3A and 3B are block diagrams showing configurations a magnetic resonance type charging apparatus 100 and the electronic device 200 applicable to the embodiments.
Figure 3B:
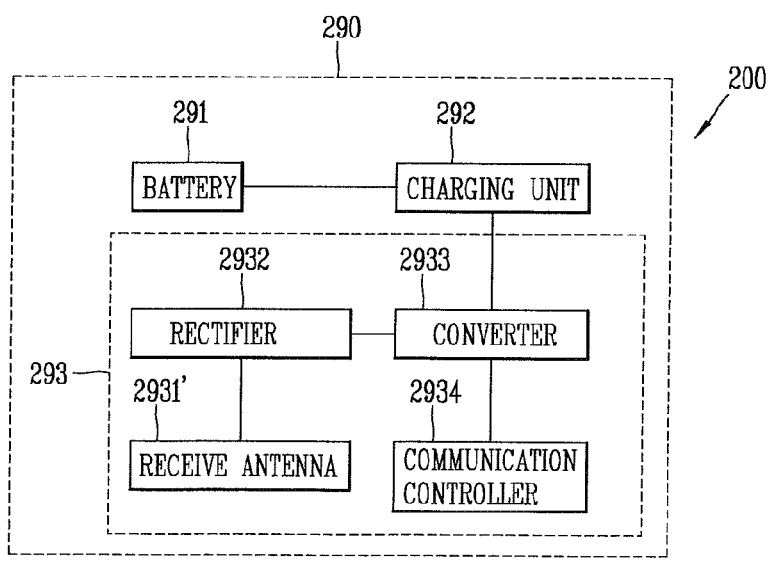

FIGS. 3A and 3B are block diagrams exemplarily showing configurations a magnetic resonance type charging apparatus 100 and the electronic device 200 applicable to the embodiments.

First, resonance will be briefly described.

A resonance indicates a phenomenon in which a vibration system periodically receives an external force at the same frequency as its natural frequency and accordingly its amplitude distinctly increases. The resonance is a phenomenon occurred with all types of vibrations, such as mechanical vibrations, electrical vibrations and the like. In general, when applying an external force enough to vibrate the vibration system, if the natural frequency is the same as the frequency of the externally applied force, the vibration becomes more severe and the amplitude increases.

Similarly, if a plurality of vibrating screens spaced apart from one another within a preset distance vibrate at the same frequency, the plurality of vibrating screens are mutually resonated. Resistance can be decreased among the plurality of vibrating screens. A resonator can be created by use of coil and condenser in an electric circuit. The resonator normally relates to electromagnetic waves or electric oscillation. The electric circuit can use the resonator as a circuit for selecting a specific frequency from electric waves received via an antenna.

Therefore, the electronic device 200 shown in FIGS. 3A and 3B can be allowed such that the battery can be charged using coupling of plane wave radiation, which is generated in the charging apparatus 100.

In detail, referring to FIG. 3A, the charging apparatus 100 can include a magnetic resonance type charging unit 120. The magnetic resonance type charging unit 120 can include a transmit antenna 121, a sensor 122, a matching element 123, an oscillator 124 and a charging controller 125. Also, the charging apparatus 100 can further include an output unit 126.

The transmit antenna 121 can be tuned (aligned) with a receive antenna to be resonant at the same frequency or near the same frequency as the receive antenna.

The sensor 122 can detect the presence or non-presence of activated receivers near a near-field generated by the transmit antenna 121. As an example, the sensor 122 can monitor a current, which is affected by presence or non-presence of active receivers near the near-field generated by the transmit antenna 121. The detection can be monitored by the controller 125 to be used upon determining whether or not to enable the oscillator 124 in order to transmit energy for communication with the electronic device 200.

The matching element 123 can induce a radio frequency (RF) signal determined by the oscillator 124, reduce a harmonic discharge to a level enough to prevent self-jamming of devices coupled to the electronic device 200, and match impedance (for example, 50 ohm) with the transmit antenna 121.

The oscillator 124 can be configured to generate an RF signal at a desired frequency and control a frequency in response to a control signal.

The controller 125 can enable the oscillator 124 during a transmission phase, control a frequency of the oscillator 124, and adjust an output power level to implement a communication protocol for interaction with neighboring devices.

The output unit 126 can display a charging state according to the control of the charging controller. The output unit 126 can be a light-emitting diode and/or LCD.

Referring to FIG. 3B, the electronic device 200 can include a power supply unit 290. The power supply unit 290 can include a battery 291, a charging unit 292 and a wireless power receiving unit 293.

The wireless power receiving unit 293 can include a receive antenna 2931', a rectifier 2932, a converter 2933 and a communication controller 2934.

The receive antenna 2931' can be tuned with the transmit antenna of the charging apparatus 100 to be resonant at the same frequency or near the same frequency as the transmit antenna of the charging apparatus 100.

The rectifier 2932 can rectify an RF energy signal received via the receive antenna 2931' into non-AC power. The converter 2933 can convert an energy potential (for example, voltage) compatible with the electronic device 200 into the rectified RF energy signal.

The communication controller 2934 can perform communications with the charging apparatus 100. The communication controller 2934 can request an authentication from the charging apparatus 100 as to whether a corresponding electronic device is a chargeable device or not. Upon the authentication request, the communication controller 2934 can transmit identification information, such as device number of the battery or the like, to the charging apparatus 100.

The charging unit 292 can charge the battery 291 using the RF energy signal received via the receive antenna 2931'. In other words, the charging unit 292 can convert the RF energy signal sent from the charging apparatus 100 into a format useable in the electronic device 200 to supply to the battery 291. The charging unit 292 can include a charging circuit for controlling battery charging, and an anti-overcurrent/overvoltage circuit for preventing an overcurrent and overvoltage.

Hereinafter, description will be given of an external structure of the charging apparatus with reference to FIGS. 4A and 4B.

Figure 4A:
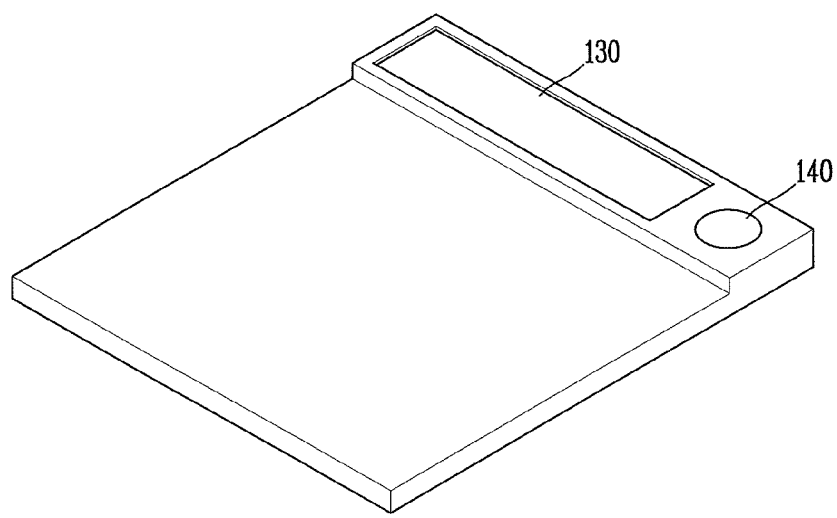
FIGS. 4A and 4B are perspective views exemplarily showing a charging apparatus for charging a plurality of electronic devices in accordance with a first embodiment.
Figure 4B:
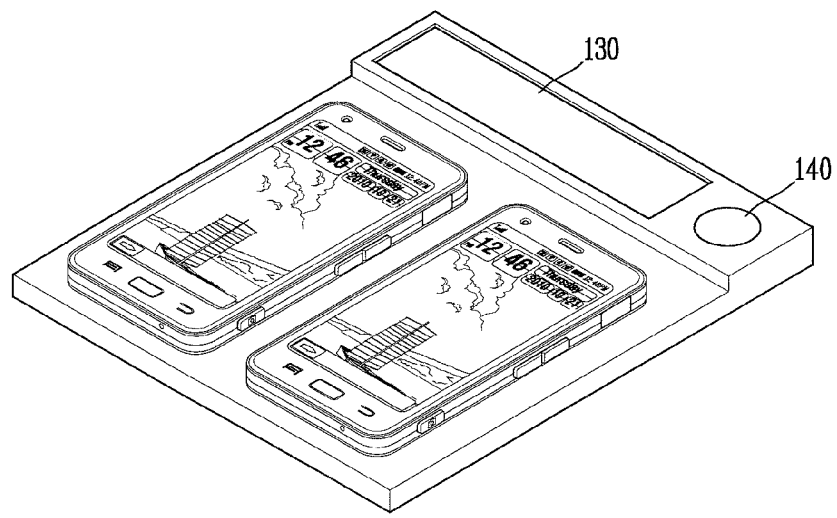

FIGS. 4A and 4B are perspective views exemplarily showing a charging apparatus for charging a plurality of electronic devices in accordance with a first embodiment.

Referring to FIG. 4A, a charging apparatus 100 for charging a plurality of electronic devices can be a pad type.

The pad type charging apparatus can be configured such that an upper surface of its body can be stepped. The electronic device 200 can be placed on a lower stepped portion of the stepped portions of the body. As aforesaid, the electromagnetic induction type charging unit 110 or the magnetic resonance type charging unit 120 can be received within the lower stepped portion of the body so as to be protected from external impact or contact with foreign materials.

An upper surface of the lower stepped portion can be formed of an insulating material, for example, plastic, to prevent an occurrence of a short due to an electrical conduction with the electronic device. Alternatively, the upper surface thereof can be coated with an insulating material.

The lower stepped portion can include a guide member for preventing the electronic device from being slid out of the upper surface when being placed on the lower stepped portion. The guide member can be installed along an edge of the upper surface of the charging apparatus, or a plurality of guide members can be installed at parts of the edge of the upper surface.

The upper stepped portion of the stepped portions can be shown having a display unit 130. Here, the upper stepped portion can be inclined such that a front surface of the display unit 130 cannot be level with the ground. That is, when the display unit 130 is installed such that the front surface is level with the ground, it can cause a problem relating to user's visibility. Hence, the display unit 130 can preferably be installed to have an inclination. To this end, the upper stepped portion can be formed to be inclined toward the lower stepped portion.

Also, a plurality of holes can be formed at the upper surface of the pad type charging apparatus. Audio output units 140 can be mounted in the plurality of holes, respectively, such that sounds generated from the audio output units 140 can be output to the exterior via the plurality of holes.

Alternatively, the plurality of holes can be formed at a side surface of the pad type charging apparatus, and the audio output units 140 can be mounted in the plurality of holes present at the side surface.

The aforesaid output unit 116 or 126 can be mounted on the upper surface of the pad type charging apparatus. The output unit 116 can be a light-emitting diode as mentioned above, and thusly light on or light off according to a charging state. Alternatively, the output unit 116 can output a different color according to the charging state.

A plurality of holes for heat exchange can be formed at the side surface of the pad type charging apparatus. The plurality of holes can alternatively be formed at the upper surface of the pad type charging apparatus. A support member can be installed on a lower surface of the pad type charging apparatus. The support member can generate a frictional force against the ground such that the pad type charging apparatus cannot be easily slipped on the ground. The support member can be made of rubber.

Meanwhile, referring to FIG. 4B, the pad type charging apparatus 100 can have a width wider than the sum of widths of two or more electronic devices, whereby at least two electronic devices can simultaneously be charged.

Figure 5A:
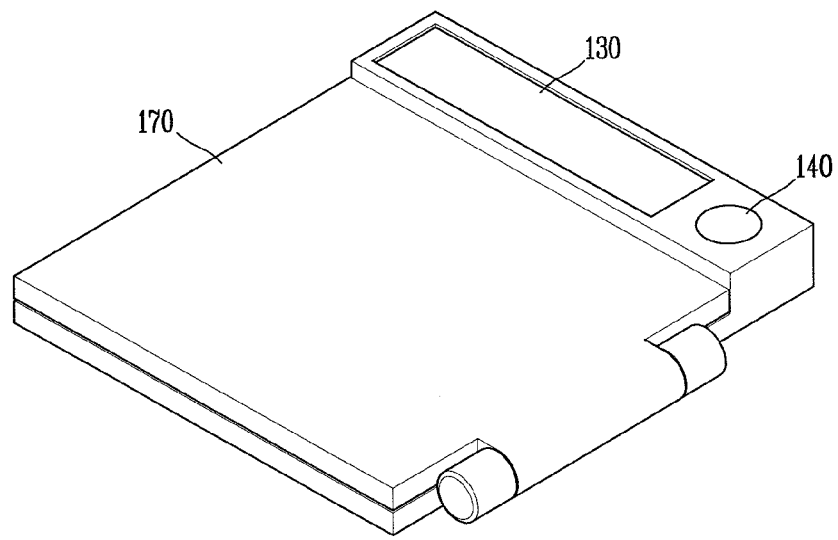
FIGS. 5A and 5B are perspective views showing one type of foldable charging apparatus for charging a plurality of electronic devices in accordance with a second embodiment.
Figure 5B:
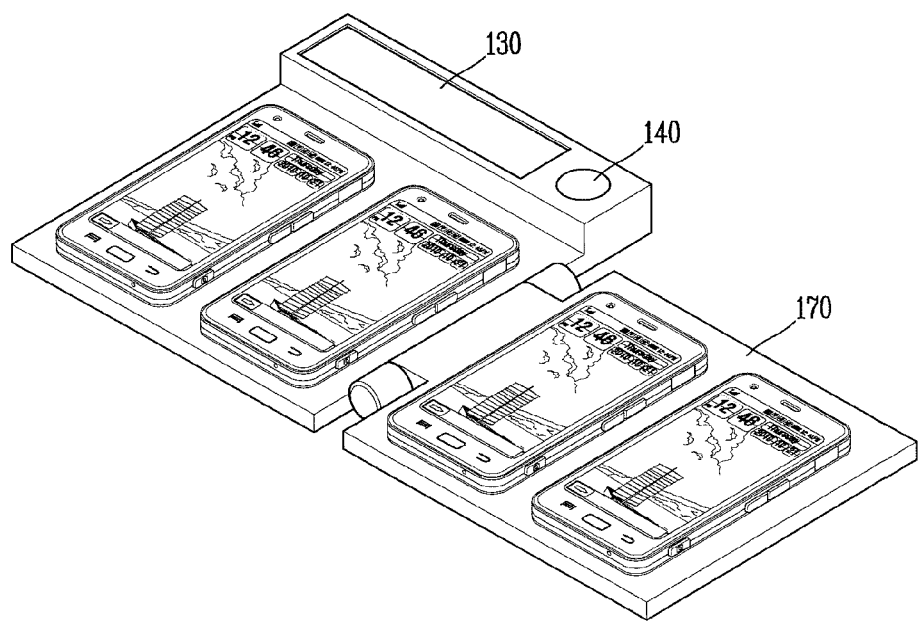

FIGS. 5A and 5B are perspective views showing one type of foldable charging apparatus for charging a plurality of electronic devices in accordance with a second embodiment, and FIG. 6 is a perspective view showing another type of foldable charging apparatus for charging a plurality of electronic devices in accordance with the second embodiment.

As shown in FIGS. 5A, 5B, 6A and 6B, the charging apparatus can be a foldable type.

In detail, referring to FIG. 5A, a main body of the charging apparatus can be obscured by a cover body 170, which is coupled to the main body by a hinge. FIG. 5 shows that a hinge coupling structure is formed at side surfaces of the main body and the cover body 170. Such structure can allow the cover body 170 to be folded or unfolded like a book.

An upper surface of the main body of the charging apparatus 100 can be stepped.

The main body can accommodate therein the electromagnetic induction type charging unit 110 or the magnetic resonance type charging unit 120.

An upper surface of the cover body 170 can be formed of an insulating material, for example, plastic, to prevent an occurrence of a short due to an electrical conduction with the electronic device. Alternatively, the upper surface thereof can be coated with an insulating material.

The upper surface of the cover body 170 can be provided with a guide member for preventing the electronic device 200 from being slid out of the upper surface when being placed on the upper surface. The guide member can be installed along an edge of the upper surface of the charging apparatus, or a plurality of guide members can be installed at parts of the edge of the upper surface.

The cover body 170 can additionally accommodate therein the electromagnetic induction type charging unit 110 or the magnetic resonance type charging unit 120, independent of the main body. Here, the main body and the cover body 170 can accommodate the same type of charging units or different types of charging units.

When the main body is obscured by the cover body 170, the charging unit 110 or 120 accommodated within the main body can be controlled not to be run. To this end, a sensor for detecting opening or closing of the charging apparatus or a switch switched on or off in response to opening or closing of the charging apparatus can be mounted within the cover body 170 or on the upper surface of the main body.

Referring to FIG. 5B, when the cover body 170 is unfolded, the cover body 170 can be flush with the main body. The inner surface of the cover body 170 can be flat to allow the electronic device 200 to be placed thereon. Also, the inner surface of the cover body 170 can be provided with a guide member for preventing the electronic device 200 from being slid out when being placed on the upper surface.

When the cover body 170 is unfolded, the charging unit 110 or 120 accommodated in the main body can be run by the aforesaid sensor or switch. When the charging unit 110 or 120 accommodated in the main body is run, the sensor 112 or 122 within the charging unit 110 or 120 can detect whether or not an electronic device 200 is placed on the main body of the charging apparatus 100. If it is detected as the electronic device 200 is placed on the main body of the charging apparatus 100, the charging unit 110 or 120 accommodated in the main body can start charging.

Figure 6A:
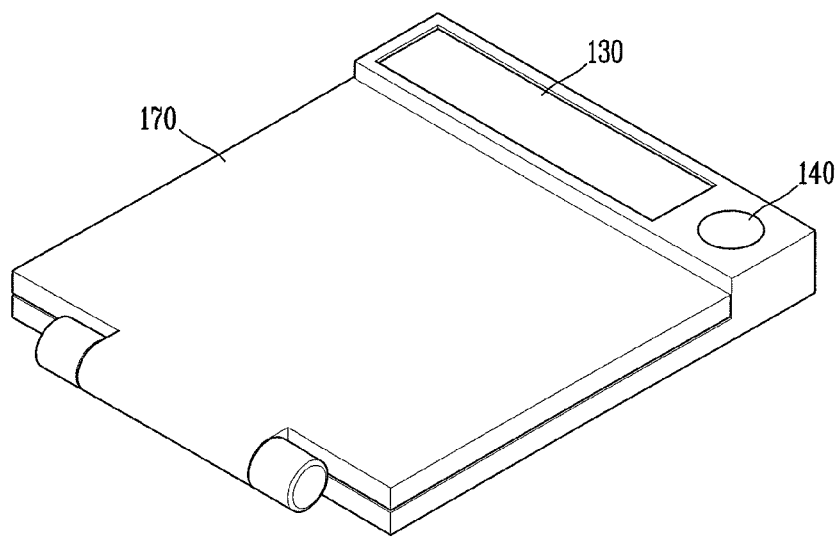
FIGS. 6A and 6B are perspective views showing another type of foldable charging apparatus for charging a plurality of electronic devices in accordance with the second embodiment.
Figure 6B:
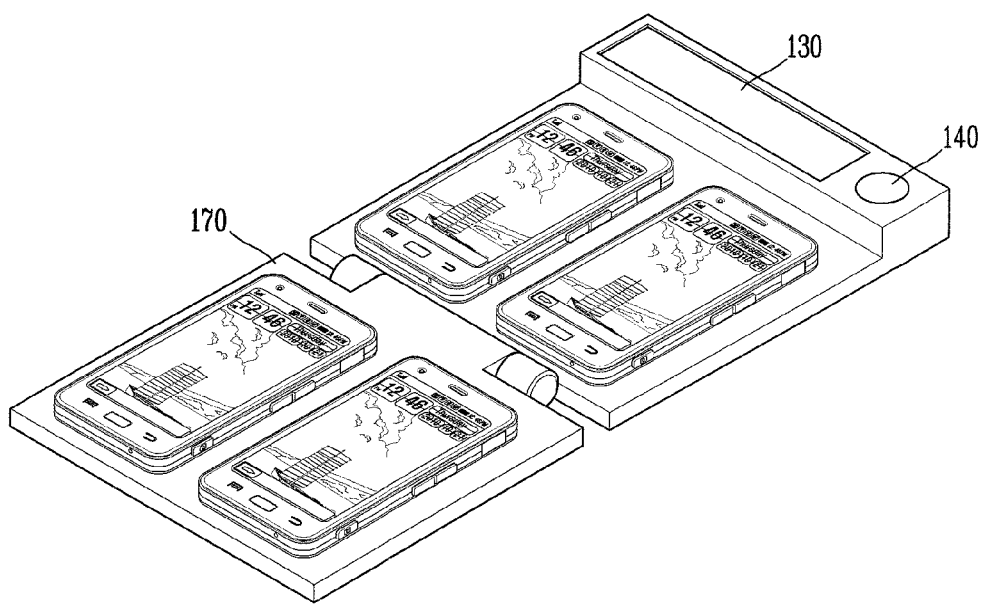

Referring to FIGS. 6A and 6B, hinge coupling structures can be formed at lower end portions of the main body and the cover body 170 in order to improve spatial efficiency on a narrow table. That is, even if the cover body 170 is open, the charging apparatus becomes longer in a lengthwise direction, which results in improvement of spatial efficiency on the narrow table.

Figure 7A:
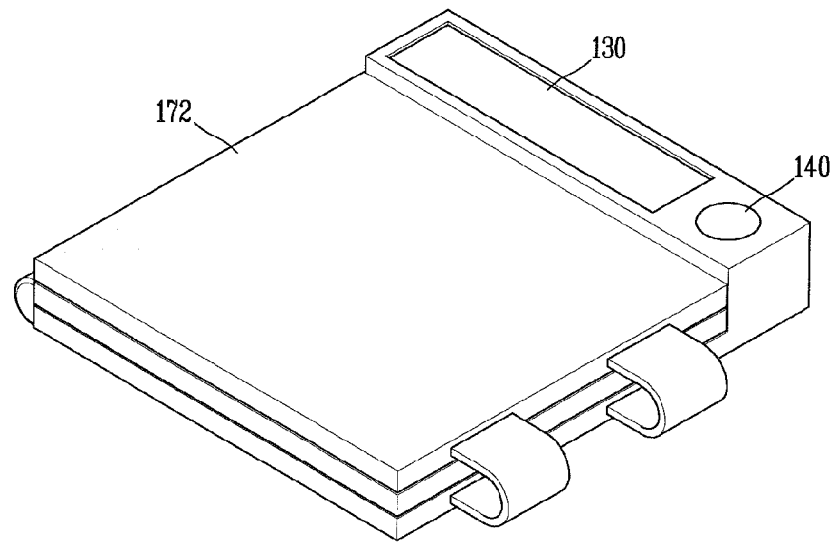
FIGS. 7A and 7B are perspective views showing still another type of foldable charging apparatus for charging a plurality of electronic devices in accordance with the second embodiment.
Figure 7B:
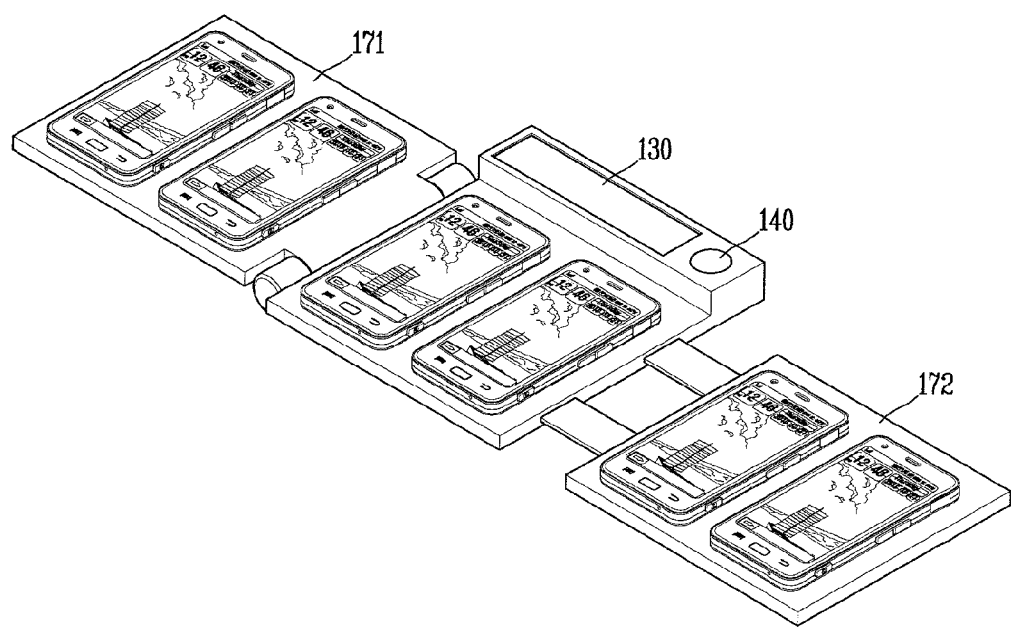

FIGS. 7A and 7B are perspective views showing still another type of foldable charging apparatus for charging a plurality of electronic devices in accordance with the second embodiment.

As shown in FIGS. 7A and 7B, a plurality of cover bodies 171 and 172 can be coupled to a main body of the charging apparatus 100 by hinges. Each of the cover bodies 171 and 172 can additionally accommodate therein the aforesaid electromagnetic induction type charging unit 110 or the magnetic resonance type charging unit 120. As the plurality of cover bodies are employed, the number of electronic devices to be charged can be increased.

Figure 8A:
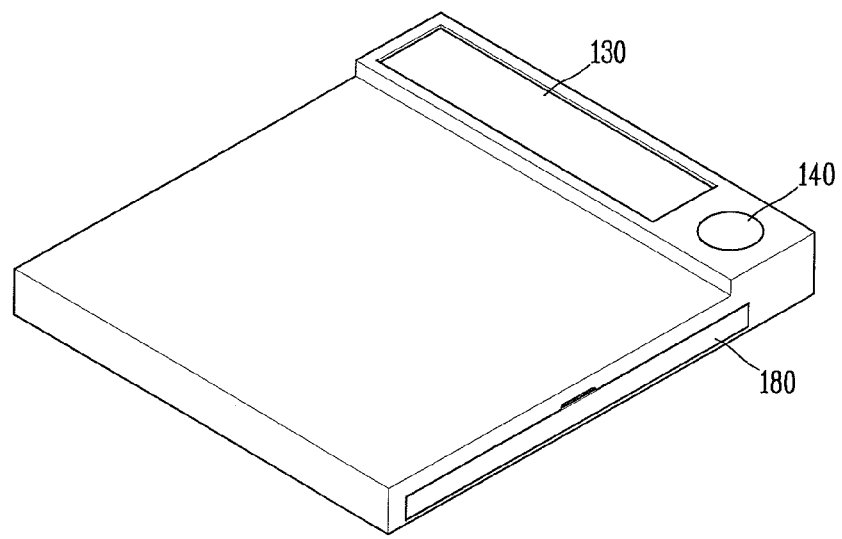
FIGS. 8A and 8B are perspective views showing a slide type charging apparatus for charging a plurality of electronic devices in accordance with a third embodiment.
Figure 8B:
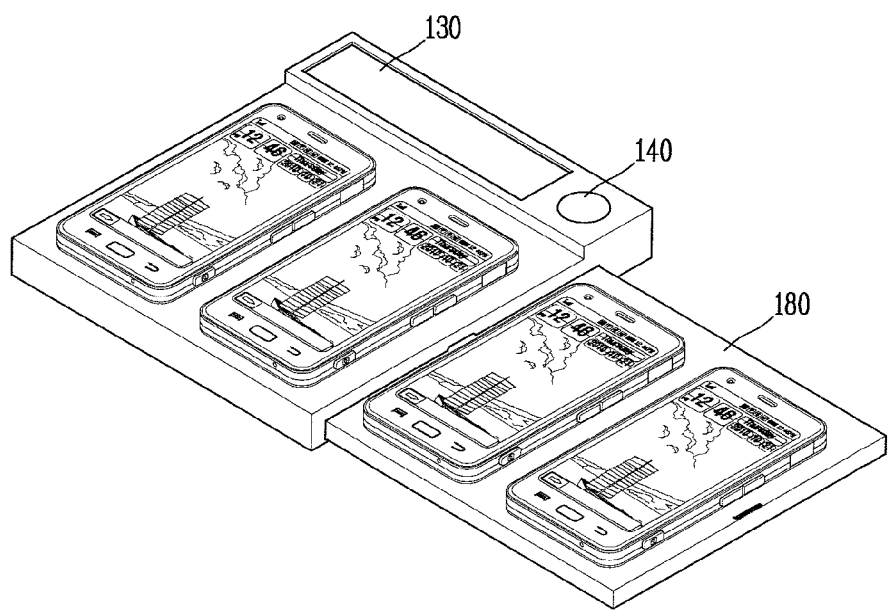

FIGS. 8A and 8B are perspective views showing a slide type charging apparatus for charging a plurality of electronic devices in accordance with a third embodiment.

As shown in FIG. 8A, a charging apparatus 100 for charging a plurality of electronic devices can be a slide type.

An extendable body 180 can be slidably retracted into one side surface of a main body of the charging apparatus 100. The extendable body 180 can be slid by a user's force or an elastic force to be drawn out as shown in FIG. 8B. A stopper can be formed at one end of the extendable body 180 so as to be obviated from being completely separated from the main body even if the extendable body 180 is pulled out by an excessive force.

An upper surface of the main body of the charging apparatus 100 can be stepped.

The aforesaid electromagnetic induction type charging unit 110 or the magnetic resonance type charging unit 120 can be mounted within the main body and the extendable body 180.

The upper surfaces of the main body and the extendable body 180 can be formed of an insulating material, for example, plastic, to prevent an occurrence of a short due to an electrical conduction with the electronic device. Alternatively, the upper surfaces thereof can be coated with an insulating material.

Each upper surface of the main body and the extendable body 180 can be provided with a guide member for preventing the electronic device 200 from being slid out of the upper surface when being placed on the upper surface. The guide member can be installed along an edge of the upper surface of the charging apparatus, or a plurality of guide members can be installed at parts of the edge of the upper surface.

Figure 9:
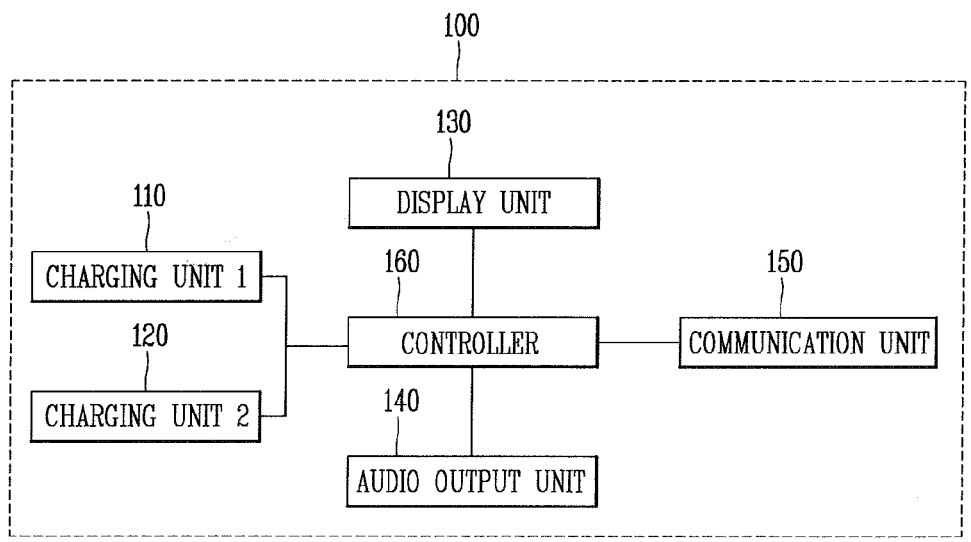
FIG. 9 is a block diagram of a charging apparatus having an additional configuration in addition to the configuration shown in FIGS. 2 and 3.

FIG. 9 is a block diagram of a charging apparatus having an additional configuration in addition to the configuration shown in FIGS. 2 and 3.

As shown in FIG. 9, the charging apparatus 100 can further include a controller 160, a display unit 130, an audio output unit 140 and a communication unit 150, in addition to the electromagnetic induction type charging unit 110 or the magnetic resonance type charging unit 120.

The controller 160 can control the charging unit 110 or 120, the display unit 130, the audio output unit 140 and the communication unit 150.

The display unit 130 can include at least one of a liquid crystal display (LCD), a thin film transistor LCD (TFT LCD), an organic light-emitting diode (OLED), a flexible display and a three-dimensional (3D) display.

The communication unit 150 can include at least one electronic component of Bluetooth™, Zigbee, ultra wide band (UWB), wireless USB and near field communication (NFC), so as to perform data communication with the electronic device 200.

The charging apparatus 100 can further include a microphone.

Hereinafter, description will be given of a configuration when the electronic device 200 is a mobile communication terminal.

Figure 10:
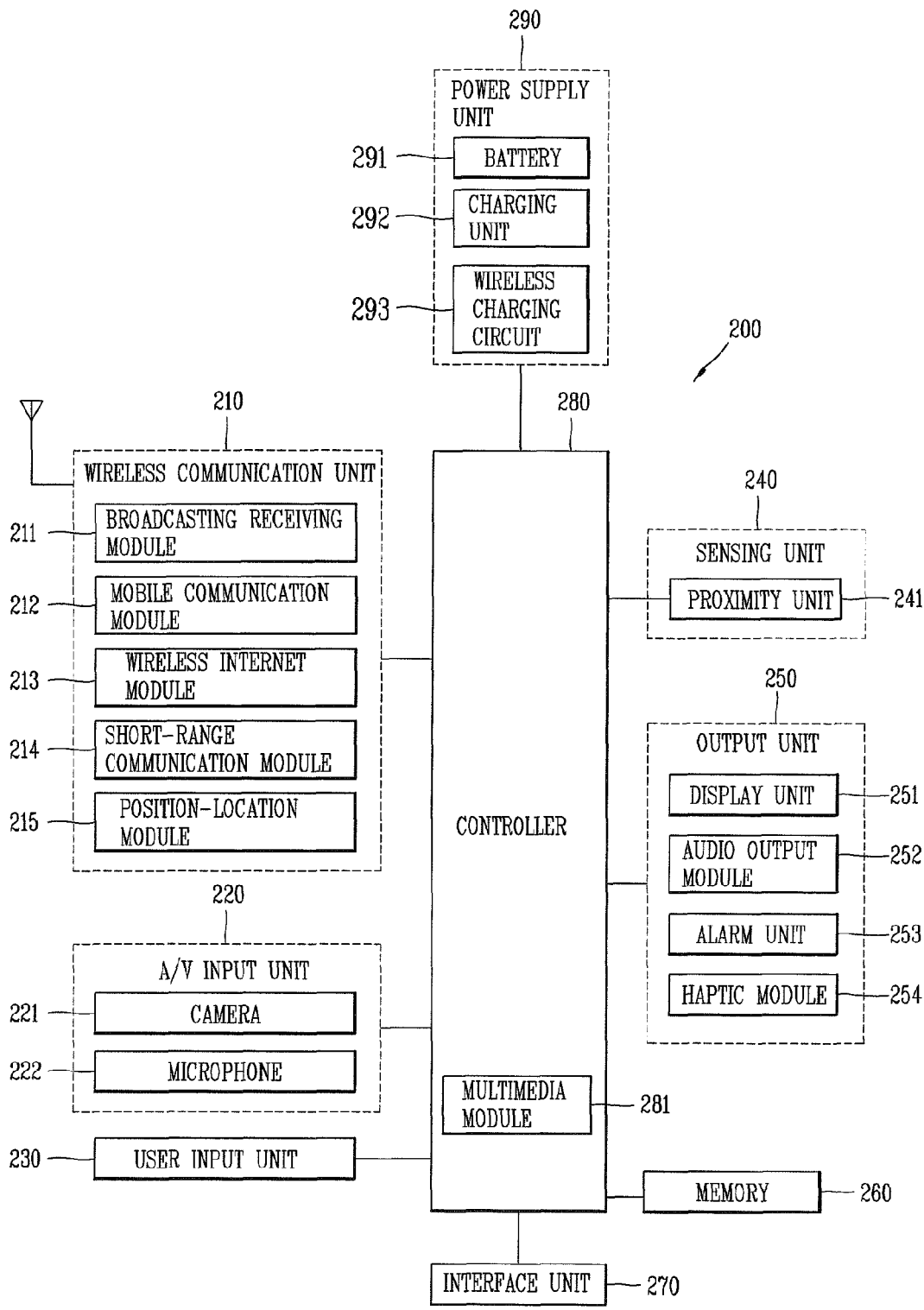
FIG. 10 is a block diagram showing a configuration when the electronic device 200 according to the embodiments is a mobile communication terminal.

FIG. 10 is a block diagram showing a configuration when the electronic device 200 according to the embodiments is a mobile communication terminal.

The mobile communication electronic device 200 can include the power supply unit 290 as shown in FIG. 2 or 3.

The electronic device 200 can further include can include components, such as a wireless communication unit 210, an Audio/Video (A/V) input unit 220, a user input unit 230, a sensing unit 240, an output unit 250, a memory 260, an interface unit 270, a controller 280 and the like. FIG. 10 shows the electronic device 200 having various components, but it is understood that implementing all of the illustrated components is not a requirement. Greater or fewer components can alternatively be implemented.

Hereinafter, each component is described in sequence.

The wireless communication unit 210 can typically include one or more modules which permit wireless communications between the electronic device 200 and a wireless communication system or between the electronic device 200 and a network within which the electronic device 200 is located. For example, the wireless communication unit 210 can include a broadcast receiving module 211, a mobile communication module 212, a wireless Internet module 213, a short-range communication module 214, a location information module 215 and the like.

The broadcasting receiving module 211 receives a broadcast signal and/or broadcast associated information from an external broadcast managing entity via a broadcast channel.

The broadcast channel can include a satellite channel and a terrestrial channel. The broadcast managing entity can indicate a server which generates and transmits a broadcast signal and/or broadcast associated information or a server which receives a pre-generated broadcast signal and/or broadcast associated information and sends them to the electronic device. The broadcast signal can be implemented as a TV broadcast signal, a radio broadcast signal, and a data broadcast signal, among others. The broadcast signal can further include a data broadcast signal combined with a TV or radio broadcast signal.

Examples of broadcast associated information can include information associated with a broadcast channel, a broadcast program, a broadcast service provider, and the like. The broadcast associated information can be provided via a mobile communication network, and received by the mobile communication module 212.

The broadcast associated information can be implemented in various formats. For instance, broadcast associated information can include Electronic Program Guide (EPG) of Digital Multimedia Broadcasting (DMB), Electronic Service Guide (ESG) of Digital Video Broadcast-Handheld (DVB-H), and the like.

The broadcasting receiving module 211 can be configured to receive digital broadcast signals transmitted from various types of broadcast systems. Such broadcast systems can include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcasting receiving module 211 can be configured to be suitable for every broadcast system transmitting broadcast signals as well as the digital broadcasting systems.

Broadcast signals and/or broadcast associated information received via the broadcasting receiving module 211 can be stored in a suitable device, such as a memory 260.

The mobile communication module 212 transmits/receives wireless signals to/from at least one of network entities (e.g., base station, an external mobile terminal, a server, etc.) on a mobile communication network. Here, the wireless signals can include audio call signal, video (telephony) call signal, or various formats of data according to transmission/reception of text/multimedia messages.

The wireless Internet module 213 supports wireless Internet access for the electronic device 200. This module can be internally or externally coupled to the electronic device 200. Examples of such wireless Internet access can include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 214 denotes a module for short-range communications. Suitable technologies for implementing this module can include BLUETOOTH™, Radio Frequency IDentification (RFID), Infrared Data Association (IrDA), Ultra-WideBand (UWB), ZigBee™, and the like. Meanwhile, wired short-range communication technologies can include Universal Serial Bus (USB), IEEE 1394, thunderbolt from Intel Corporation and the like.

The location information module 215 denotes a module for detecting or calculating a position of a mobile terminal. An example of the location information module 215 can include a Global Position System (GPS) module.

Referring to FIG. 10, the A/V input unit 220 is configured to provide audio or video signal input to the electronic device. The A/V input unit 220 can include a camera 221 and a microphone 222. The camera 221 receives and processes image frames of still pictures or video obtained by image sensors in a video call mode or a capturing mode. The processed image frames can be displayed on a display unit 251.

The image frames processed by the camera 221 can be stored in the memory 260 or transmitted to the exterior via the wireless communication unit 210. Two or more cameras 221 can be provided according to the configuration of the electronic device.

The microphone 222 can receive an external audio signal while the electronic device is in a particular mode, such as a phone call mode, a recording mode, a voice recognition mode, or the like. This audio signal is processed into digital data. The processed digital data is converted for output into a format transmittable to a mobile communication base station via the mobile communication module 212 when in the phone call mode. The microphone 222 can include assorted noise removing algorithms to remove noise generated in the course of receiving the external audio signal.

The user input unit 230 can generate input data input by a user to control the operation of the electronic device. The user input unit 230 can include a keypad, a dome switch, a touchpad (e.g., static pressure/capacitance), a jog wheel, a jog switch and the like.

The sensing unit 240 provides status measurements of various aspects of the electronic device. For instance, the sensing unit 240 can detect an open/close status of the electronic device 200, a change in a location of the electronic device 200, a presence or absence of user contact with the electronic device 200, the location of the electronic device 200, acceleration/deceleration of the electronic device 200, and the like, so as to generate a sensing signal for controlling the operation of the electronic device 200. For example, regarding a slide-type electronic device, the sensing unit 240 can sense whether a sliding portion of the electronic device is open or closed. Other examples include sensing functions, such as the sensing unit 240 sensing the presence or absence of power provided by the power supply unit 290, the presence or absence of a coupling or other connection between the interface unit 270 and an external device. Meanwhile, the sensing unit 240 can include a proximity sensor 241.

The output unit 250 is configured to output an audio signal, a video signal or a tactile signal. The output unit 250 can include a display unit 251, an audio output module 252, an alarm unit 253 and a haptic module 254.

The display unit 251 can output information processed in the electronic device 200. For example, when the electronic device 200 is operating in a phone call mode, the display unit 251 will provide a User Interface (UI) or a Graphic User Interface (GUI), which includes information associated with the call. As another example, if the electronic device 200 is in a video call mode or a capturing mode, the display unit 251 can additionally or alternatively display images captured and/or received, UI, or GUI.

The display unit 251 can be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of such displays 151 can be implemented as a transparent type or an optical transparent type through which the exterior is visible, which is referred to as 'transparent display'. A representative example of the transparent display can include a Transparent OLED (TOLED), and the like. The rear surface of the display unit 251 can also be implemented to be optically transparent. Under this configuration, a user can view an object positioned at a rear side of a terminal body through a region occupied by the display unit 251 of the terminal body.

The display unit 251 can be implemented in two or more in number according to a configured aspect of the electronic device 200. For instance, a plurality of the displays 151 can be arranged on one surface to be spaced apart from or integrated with each other, or can be arranged on different surfaces.

Here, if the display unit 251 and a touch sensitive sensor (referred to as a touch sensor) have a layered structure therebetween, the structure can be referred to as a touch screen. The display unit 251 can be used as an input device rather than an output device. The touch sensor can be implemented as a touch film, a touch sheet, a touch pad, and the like.

The touch sensor can be configured to convert changes of a pressure applied to a specific part of the display unit 251, or a capacitance occurring from a specific part of the display unit 251, into electric input signals. Also, the touch sensor can be configured to sense not only a touched position and a touched area, but also a touch pressure.

When touch inputs are sensed by the touch sensors, corresponding signals are transmitted to a touch controller. The touch controller processes the received signals, and then transmits corresponding data to the controller 280. Accordingly, the controller 280 can sense which region of the display unit 251 has been touched.

Still referring to FIG. 10, a proximity sensor 241 can be arranged at an inner region of the electronic device 200 covered by the touch screen, or near the touch screen. The proximity sensor 241 indicates a sensor to sense presence or absence of an object approaching to a surface to be sensed, or an object disposed near a surface to be sensed, by using an electromagnetic field or infrared rays without a mechanical contact. The proximity sensor 241 has a longer lifespan and a more enhanced utility than a contact sensor.

The proximity sensor 241 can include a transmissive type photoelectric sensor, a direct reflective type photoelectric sensor, a minor reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. The touch screen (touch sensor) can be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 241 senses proximity touch, and proximity touch patterns (e.g., distance, direction, speed, time, position, moving status, etc.). Information relating to the sensed proximity touch and the sensed proximity touch patterns can be output onto the touch screen.

The audio output module 252 can output audio data received from the wireless communication unit 210 or stored in the memory 260, in a call-receiving mode, a call-placing mode, a recording mode, a voice recognition mode, a broadcast reception mode, and so on. The audio output module 252 can output audio signals relating to functions performed in the electronic device 200, e.g., sound alarming a call received or a message received, and so on. The audio output module 252 can include a receiver, a speaker, a buzzer, and so on.

The alarm unit 253 outputs signals notifying occurrence of events from the electronic device 200. The events occurring from the electronic device 200 can include call received, message received, key signal input, touch input, and so on. The alarm unit 253 can output not only video or audio signals, but also other types of signals such as signals notifying occurrence of events in a vibration manner. Since the video or audio signals can be output through the display unit 251 or the audio output module 252, the display unit 251 and the audio output module 252 can be categorized into a part of the alarm unit 253.

The haptic module 254 generates various tactile effects which a user can feel. A representative example of the tactile effects generated by the haptic module 254 includes vibration. Vibration generated by the haptic module 254 can have a controllable intensity, a controllable pattern, and so on. For instance, different vibration can be output in a synthesized manner or in a sequential manner.

The haptic module 254 can generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 254 can be configured to transmit tactile effects (signals) through a user's direct contact, or a user's muscular sense using a finger or a hand. The haptic module 254 can be implemented in two or more in number according to the configuration of the electronic device 200.

The memory 260 can store a program for the processing and control of the controller 280. Alternatively, the memory 260 can temporarily store input/output data (e.g., phonebook data, messages, still images, video and the like). Also, the memory 260 can store data related to various patterns of vibrations and audio output upon the touch input on the touch screen.

Also, the memory 260 can store a wireless charging application downloaded from an application providing server (e.g., App store).

The memory 260 can be implemented using any type of suitable storage medium including a flash memory type, a hard disk type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and the like. Also, the electronic device 200 can operate a web storage which performs the storage function of the memory 260 on the Internet.

The interface unit 270 can generally be implemented to interface the electronic device 200 with external devices. The interface unit 270 can allow a data reception from an external device, a power delivery to each component in the electronic device 200, or a data transmission from the electronic device 200 to an external device. The interface unit 270 can include, for example, wired/wireless headset ports, external charger ports, wired/wireless data ports, memory card ports, ports for coupling devices having an identification module, audio Input/Output (I/O) ports, video I/O ports, earphone ports, and the like.

The identification module can be configured as a chip for storing various information required to authenticate an authority to use the electronic device 200, which can include a User Identity Module (UIM), a Subscriber Identity Module (SIM), and the like. Also, the device having the identification module (hereinafter, referred to as 'identification device') can be implemented in a type of smart card. Hence, the identification device can be coupled to the electronic device 200 via a port.

Also, the interface unit 270 can serve as a path for power to be supplied from an external cradle to the electronic device 200 when the electronic device 200 is connected to the external cradle or as a path for transferring various command signals input from the cradle by a user to the electronic device 200. Such various command signals or power input from the cradle can operate as signals for recognizing that the electronic device 200 has accurately been mounted to the cradle.

The controller 280 typically controls the overall operations of the electronic device 200. For example, the controller 280 performs the control and processing associated with telephony calls, data communications, video calls, and the like. The controller 280 can include a multimedia module 281 which provides multimedia playback. The multimedia module 281 can be configured as part of the controller 280 or as a separate component.

The controller 280 can perform a pattern recognition processing so as to recognize writing or drawing input on the touch screen as text or image.

The controller 280 can perform a wired charging or a wireless charging according to a user input or an internal input. Here, the internal input can be a signal indicating that an induced current generated from a secondary coil within the electronic device 200 has been detected.

The power supply unit 290 provides power required by various components under the control of the controller 280. The provided power can be internal power, external power, or combination thereof.

The power supply unit 290 can include a battery 291 for supplying power to each component of the electronic device 200, and the battery 291 can include a charging unit 292 for a wired or wireless charging.

Figure 11:
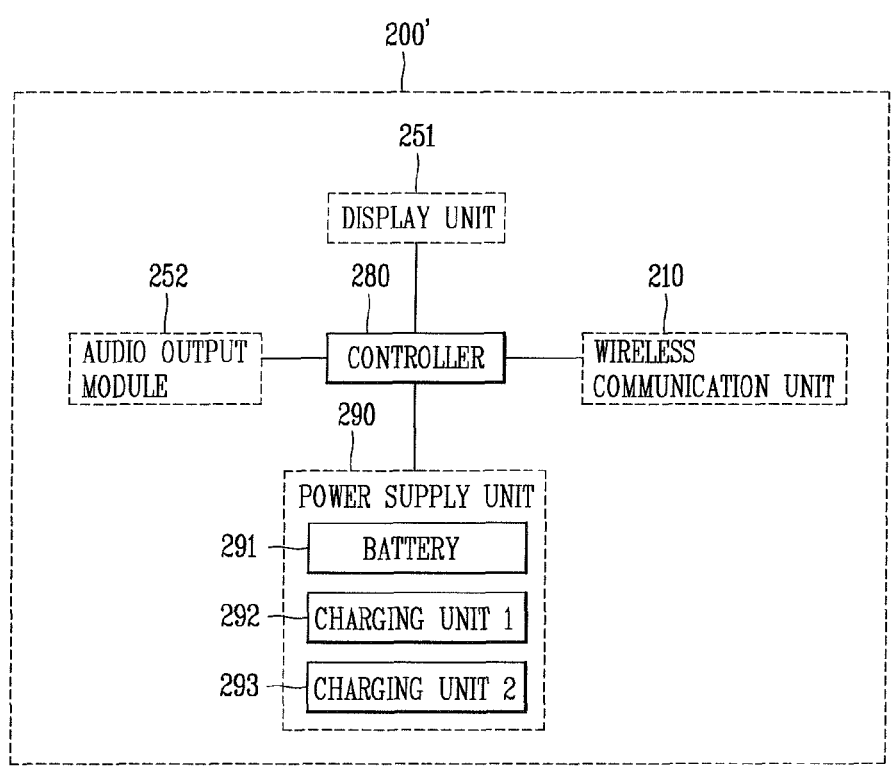
FIG. 11 is a block diagram showing a configuration when the electronic device 200 according to the embodiments is a multimedia device, for example, a tablet.

FIG. 11 is a block diagram showing a configuration when the electronic device 200 is a multimedia device, for example, a tablet.

The multimedia device 200' can include the power supply unit 290 shown in FIG. 2 or 3.

The multimedia device 200' can include a controller 280. Also, the multimedia device 200' can further include at least one of a display unit 251 and an audio output module 252.

The multimedia device 200' can further include a wireless communication unit 210. The configurations of the display unit 251 and the audio output module 252 can be understood by the description of FIG. 10.

The controller 280 can control the display unit 251 and the audio output module 252 to reproduce contents. For example, the controller 280 can output an image in response to the reproduction of contents on a screen of the display unit 251, and output sound in response to the reproduction of contents via the audio output module 252.

The wireless communication unit 210 can indicate a short-range communication module, which uses wireless short-range communication technologies including Bluetooth, Radio Frequency IDentification (RFID), Infrared Data Association (IrDA), Ultra WideBand (UWB), ZigBee, and the like. Meanwhile, wired short-range communication technologies can include Universal Serial Bus (USB), IEEE 1394, thunderbolt from Intel Corporation and the like.

The foregoing description has been given of the configuration of the multimedia device 200'. Hereinafter, operations of the charging apparatus 100 and the electronic device 200 will be described.

Figure 12A:
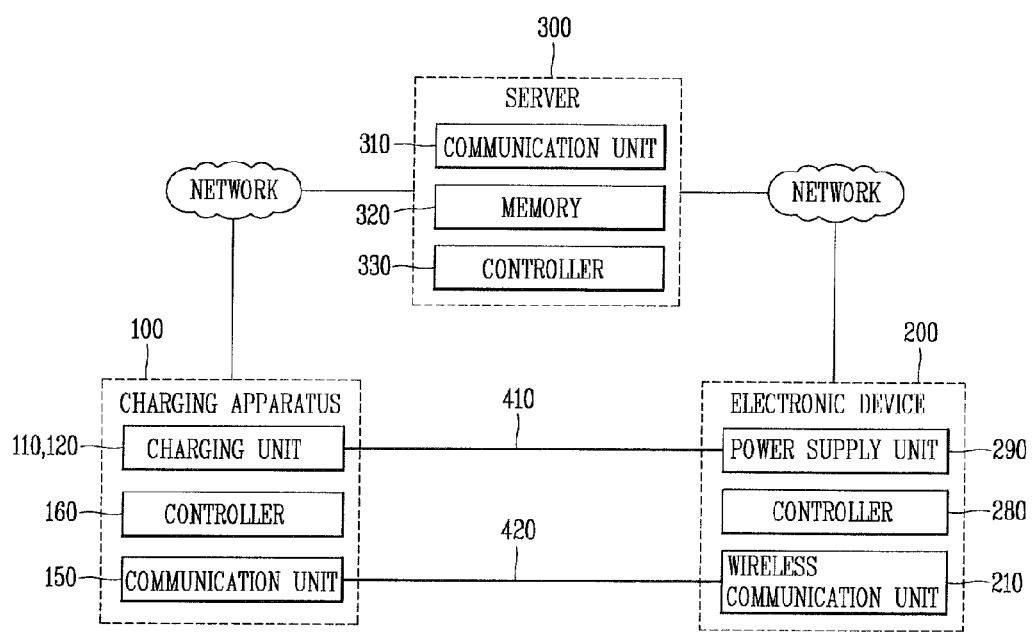
FIG. 12A is an overview showing a wireless charging system in accordance with one embodiment.

FIG. 12A is an overview showing a wireless charging system in accordance with one embodiment.

A wireless charging system can include a charging apparatus 100, an electronic device 200 and a server 300. The server 300 can include a communication unit 310, a memory 320 and a controller 330.

The communication unit 310 can allow communications between the server 300 and the charging apparatus 100 or between the sever 300 and the electronic device 200. In accordance with one embodiment, the communication unit 310 can receive identification information relating to the electronic device 200 from the charging apparatus 100. Here, the identification information relating to the electronic device 200, for example, can be at least one of a device identification number of the electronic device 200, a Media Access Control (MAC) address, an Internet Protocol (IP) address and a user's ID and password stored in the server 300.

The communication unit 310 can transmit authentication result information relating to the electronic device 200 to the charging apparatus 100. Here, the authentication result information relating to the electronic device 200 can inform successful or unsuccessful authentication of the electronic device 200.

The memory 320 can store a program for operations of the controller 330, and temporarily store input/output data. In accordance with one embodiment, the memory 320 can store the identification information relating to the electronic device 200.

The controller 330 typically controls an overall operation of the server 300. In accordance with one embodiment, when receiving an authentication request for the electronic device 200 from the charging apparatus 100, the controller 330 can determine whether or not the identification information relating to the electronic device 200 included in the authentication request is present in the memory 320 and generate authentication result information according to the determination result. For example, the controller 330 can generate the authentication result information indicating a successful authentication when the identification information is stored in the memory 320, whereas generating authentication result information indicating an unsuccessful authentication when the identification information is not stored in the memory 320.

The charging unit 110 of the charging apparatus 100 can be connected to the power supply unit 290 of the electronic device 200 via a power channel 410. The charging unit 110 can wirelessly supply power to the electronic device 200, or perform transmission and reception of a control signal for wireless power supply with the electronic device 200.

The communication unit 150 of the charging apparatus 100 can be connected to the wireless communication unit 210 of the electronic device 200 via a data channel 420, and perform data transmission and reception with the electronic device 200 in a wireless manner.

Meanwhile, the server 300 can be connected to the electronic device 200 via a network. Here, the server 300 can receive data for registering the electronic device 200 in the server 300 itself from the electronic device 200, and transmit the registration result to the electronic device 200. In one embodiment, the electronic device 200 can transmit payment information to the server 300 and the server 300 can transmit approval information to the electronic device 300 in response to the payment information.

Figure 12B:
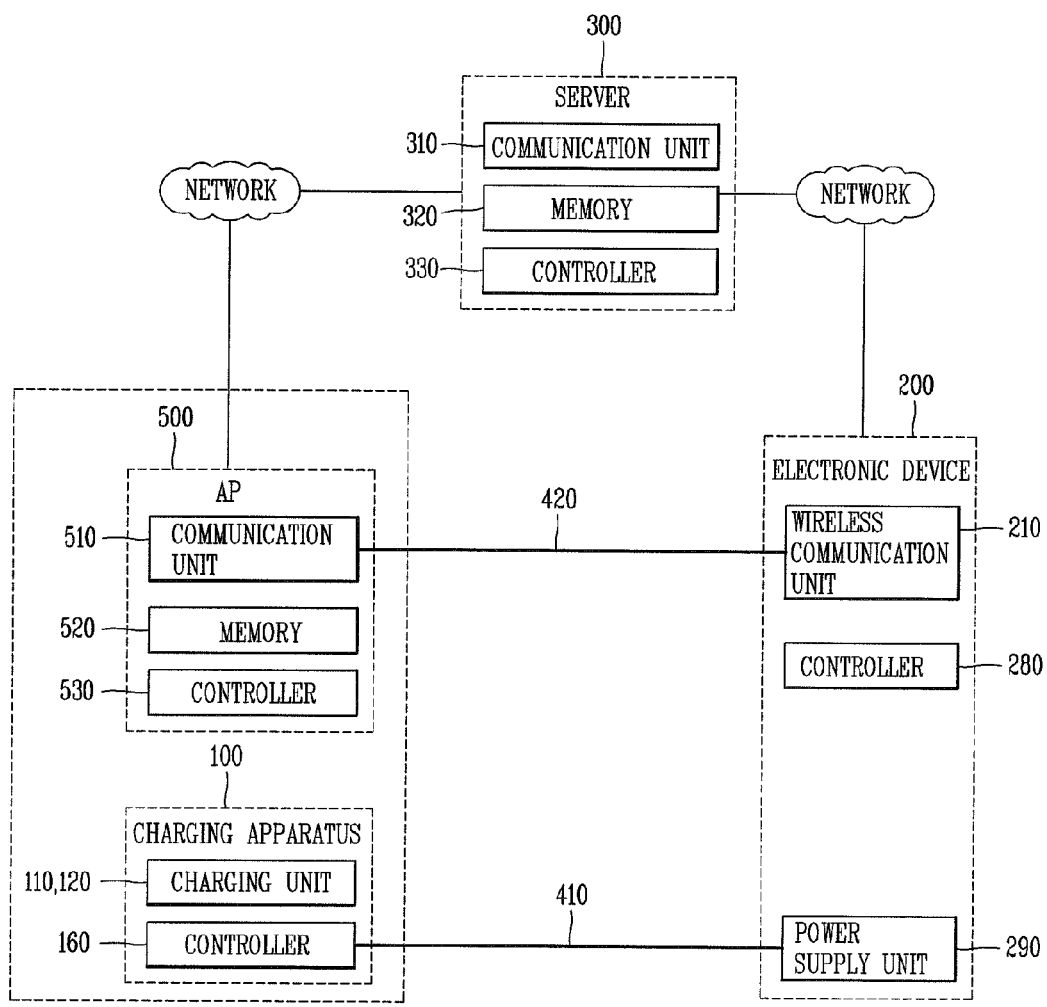
FIG. 12B is an overview showing a wireless charging system in accordance with another embodiment.

FIG. 12B is an overview showing a wireless charging system in accordance with another embodiment.

A wireless charging system can include a data and power communication unit, an electronic device 200 and a server 300. The data and power communication unit can include a charging apparatus 100 and an access point (AP) 500.

The charging apparatus 100 can have the same components as those of the charging apparatus 100 shown in FIG. 12A. However, the charging apparatus 100 shown in FIG. 12B can be different from the charging apparatus 100 shown in FIG. 12A in that the function of the communication unit 150 for data transmission and reception with the electronic device 200 or the server 300 is replaced by the AP 500.

The AP 500 can perform a function of connecting (accessing) the charging apparatus 100 to the electronic device 200 or the server 300 using Wi-Fi, Bluetooth or associated standards. The AP 500 can substitute for the communication unit 150 of the charging apparatus 100 shown in FIG. 12A. The AP 500 can include a communication unit 510, a memory 520 and a controller 530.

The communication unit 510 can be connected to the wireless communication unit 210 of the electronic device 200 via a data channel 420, and perform data transmission and reception with the electronic device 200 in a wireless manner. Also, the communication unit 510 can be connected to the communication unit 310 of the server 300 via a network, and perform data transmission and reception with the server 300.

The memory 520 can store information, such as Service Set Identifier (SSID) and the like, which is used by the AP 500 to allow the access from the electronic device 200 to the server 300 on a network.

The controller 530 can control operations of the communication unit 510 and the memory 520.

Figure 13:
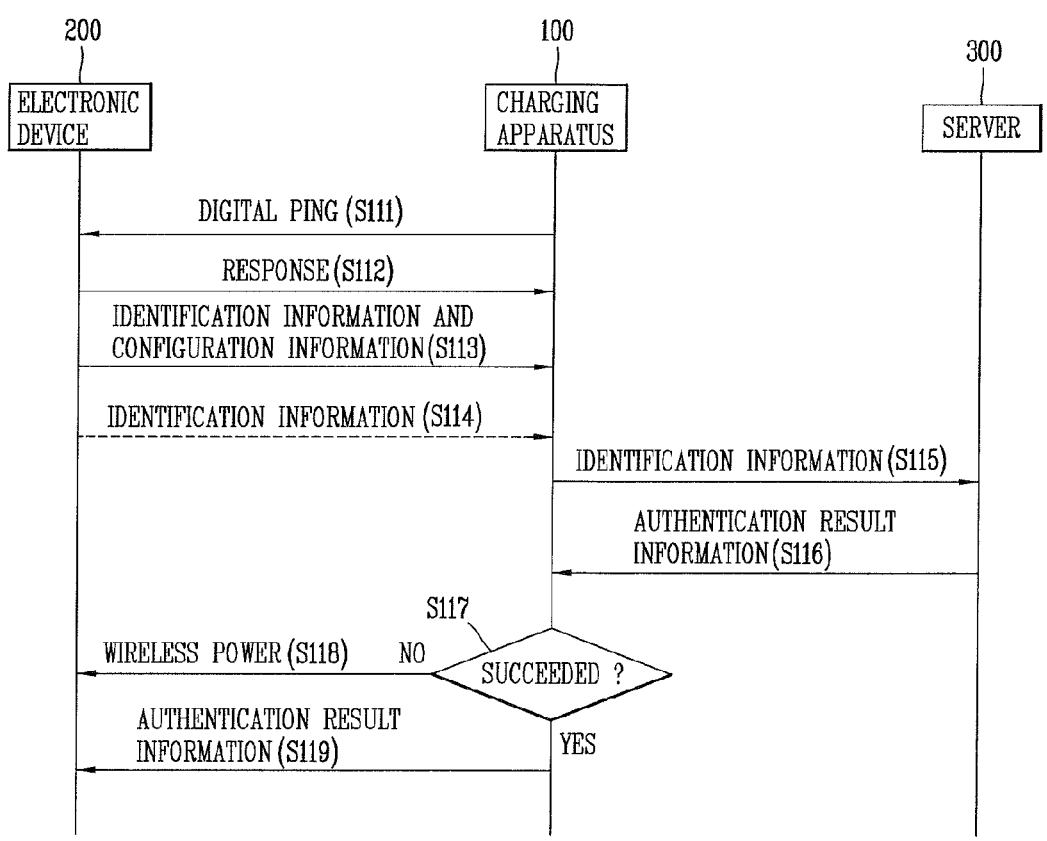
FIG. 13 is a flowchart showing an operation control process of a wireless charging system in accordance with one embodiment.

FIG. 13 is a flowchart showing an operation control process of a wireless charging system in accordance with one embodiment.

First, the charging unit 110 or 120 of the charging apparatus 100 can execute a digital ping (S111). That is, the charging unit 110 or 120 can transmit a packet, which includes a message for checking whether or not to be accessible to the electronic device 200.

The power supply unit 290 of the electronic device 200 transmits to the charging apparatus 100 a packet, which includes a message indicating presence of the electronic device 200, in response to the check message (S112).

Also, the power supply unit 290 of the electronic device 200 can transmit to the charging apparatus 100 identification information and configuration information both related to the electronic device 200 (S113).

Here, the wireless communication unit 210 of the electronic device 200 can transmit the identification information related to the electronic device 200 to the charging apparatus 100 (S 114). Here, the communication unit 150 of the charging apparatus 100 can receive the identification information.

The communication unit 150 of the charging apparatus 100 can transmit the identification information received from the electronic device 200 to the server 300 (S115).

The communication unit 310 of the server 300 can receive the identification information related to the electronic device 200, and the controller 330 can search for the identification information related to the electronic device 200 from the memory 320 to generate authentication result information.

The communication unit 310 of the server 300 can transmit the authentication result information to the charging apparatus 100 (S116).

The controller 160 of the charging apparatus 100 can analyze the authentication result information and determine whether the authentication result information indicates successful authentication or unsuccessful authentication (S117).

If the authentication result information indicates the successful authentication, the charging unit 110 or 120 of the charging apparatus 100 can wirelessly transmit power to the electronic device 200 (S118).

On the other hand, if the authentication result information indicates the unsuccessful authentication, the communication unit 150 of the charging apparatus 100 can wirelessly transmit the authentication result information to the electronic device 200 (S119).

Therefore, the electronic device 200 can wirelessly receive power or receive a message indicating the unsuccessful authentication according to whether the identification information related to the electronic device 200 is stored in the server 300.

Meanwhile, the charging apparatus 100 can receive account information related to the electronic device 200 from the server 300, and wirelessly transmit power to the electronic device 200 based upon the account information. The account information can be information related to whether or not a user of the electronic device 200 has paid a charge for receiving a wireless charging service. If not paid, the charging apparatus 100 can not wirelessly transmit power to the electronic device 200 immediately even if the authentication result information received from the server 300 indicates the successful authentication. Also, the charging apparatus 100 can wirelessly transmit power to the electronic device 200 according to a charge amount or charge time corresponding to the charge paid according to the account information.

Figure 14A:
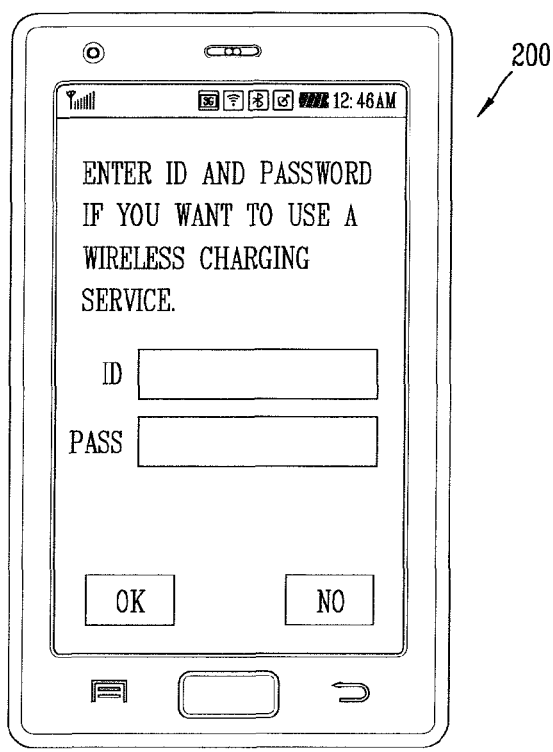
FIGS. 14A to 14C are overviews showing the operation control process of the wireless charging system in accordance with the one embodiment.
Figure 14B:
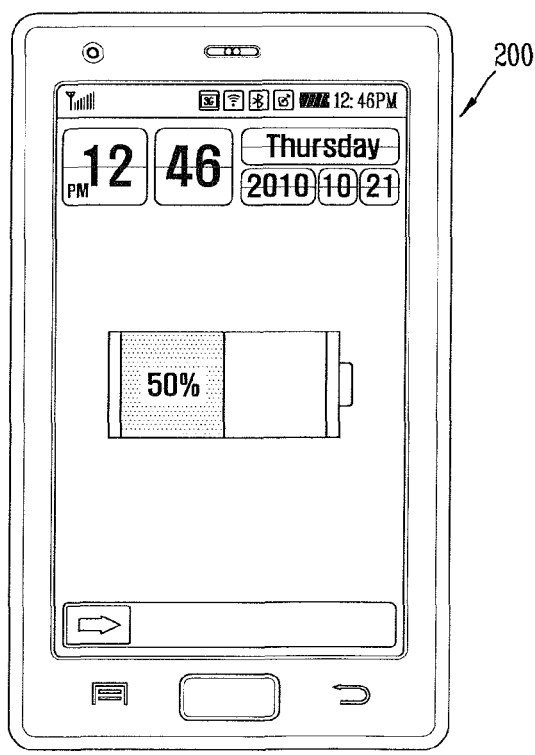
Figure 14C:
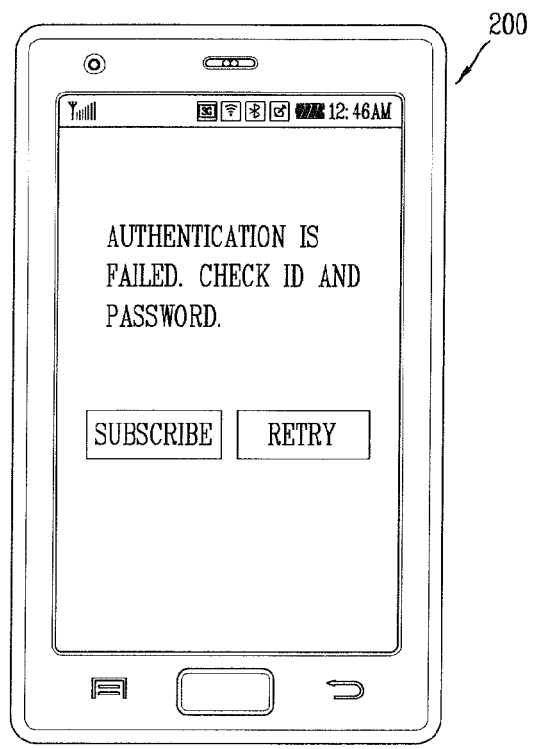

FIGS. 14A to 14C are overviews showing the operation control process of the wireless charging system in accordance with the one embodiment.

As shown in FIG. 14A, when the electronic device 200 enters a wireless charging service area (for example, upon receiving a message for checking presence or non-presence of the electronic device 200 from the charging apparatus 100), the electronic device 200 can receive an identification information request from the charging apparatus 100 and display an interface for inputting the identification information. The wireless charging service area, as will be explained in detail in FIG. 17, can indicate an area in which the power supply unit 290 of the electronic device 200 can receive a message for wirelessly receiving power from the charging unit 110 or 120 of the charging apparatus 100.

The electronic device 200 can provide an interface for allowing inputting of a user's ID and password stored in the server 300 via the user input unit 230. Upon receiving the user's ID and password via the user input unit 230, the power supply unit 290 or the wireless communication unit 210 of the electronic device 200 can transmit information related to the input ID and password to the charging apparatus 100.

When the charging apparatus 100 receives the information related to the user's ID and password from the electronic device 200, the communication unit 150 of the charging apparatus 100 can transmit an authentication request for the electronic device 200, which includes the information related to the ID and password, to the server 300. Also, the charging apparatus 100 can receive authentication result information from the server 300 in response to the authentication request for the electronic device 200.

The controller 160 of the charging apparatus 100 can then analyze the authentication result information received from the server 300. If the authentication result information indicates a successful authentication, the controller 160 can control the charging unit 110 or 120 of the charging apparatus 100 to wirelessly transmit power to the electronic device 200. On the other hands, if the authentication result information indicates an unsuccessful authentication, the controller 160 can control the communication unit 150 of the charging apparatus 100 to transmit the authentication result information to the electronic device 200.

That is, referring to FIG. 14B, upon wirelessly receiving power from the charging apparatus 100, the display unit 251 of the electronic device 200 can display an indicator indicating that the electronic device 200 is being charged. The indicator can indicate a charging state of the electronic device 200, for example, can indicate a charge amount of the electronic device 200.

Referring to FIG. 14C, upon reception of the authentication result information from the charging apparatus 100, the display unit 251 of the electronic device 200 can display a message indicating an unsuccessful authentication. Here, the controller 280 of the electronic device 200 can provide a menu for registering the electronic device 200 or a user of the electronic device 200, a menu for re-inputting at least of ID and password, and the like.

Figure 15:
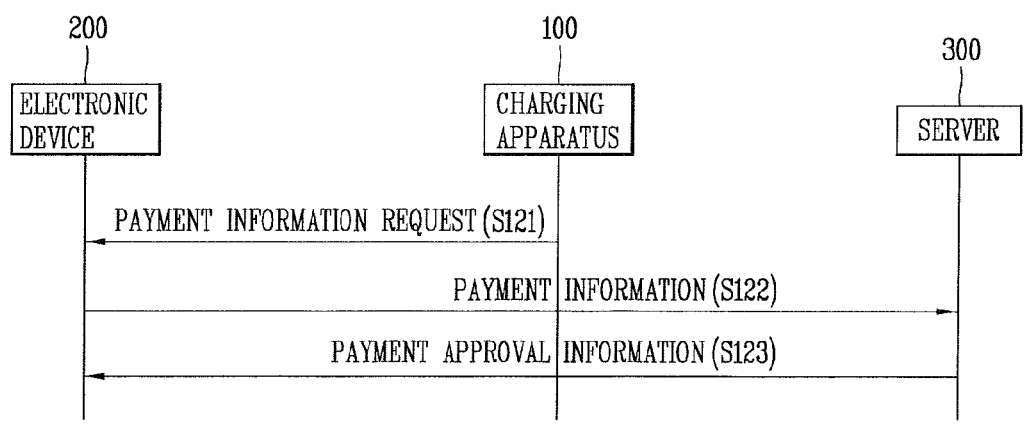
FIG. 15 is a flowchart showing an operation control process of the wireless charging system in accordance with another embodiment.

FIG. 15 is a flowchart showing an operation control process of a wireless charging system in accordance with another embodiment.

Meanwhile, the communication unit 150 of the charging apparatus 100 can request payment information from the electronic device 200 when transmitting the authentication result information to the electronic device 200 (S121). For example, when the electronic device 200 has been registered in the server 300 but payment information is not present, the communication unit 150 of the charging apparatus 100 can request the payment information from the electronic device 200.

In response to the request, the wireless communication unit 210 of the electronic device 200 can transmit the payment information input by the user to the server 300 (S122). Here, the wireless communication unit 210 of the electronic device 200 can transmit the payment information to the server 300 via the charging apparatus 100 (or the communication unit 150 of the charging apparatus 100).

Also, the controller 330 of the server 300 can determine whether or not the payment information received from the electronic device 200 is valid, and the communication unit 310 of the server 300 can transmit payment approval information to the electronic device 200 (S123). Here, the communication unit 310 of the server 300 can transmit the payment approval information to the electronic device 200 via the charging apparatus 100 (or the communication unit 150 of the charging apparatus 100).

Here, the payment approval information can indicate payment success when the payment information is valid, and payment failure when the payment information is not valid. The display unit 251 of the electronic device 200 can display the payment approval information.

FIGS. 16A to 16F are overviews showing the operation control process of the wireless charging system in accordance with the another embodiment.

Figure 16A:
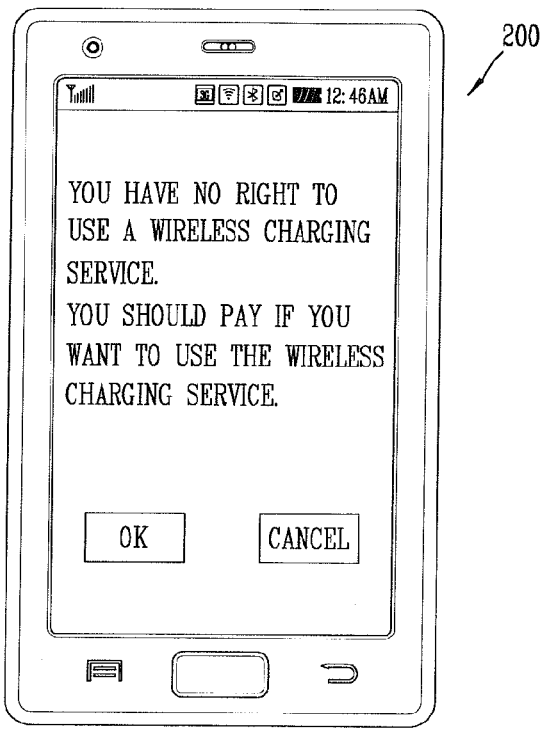
FIGS. 16A to 16F are overviews showing the operation control process of the wireless charging system in accordance with the another embodiment.

Referring to FIG. 16A, when the authentication result information relating to the electronic device 200, received from the server 300, indicates the unsuccessful authentication, the communication unit 150 of the charging apparatus 100 can request payment information with transmitting the authentication result information to the electronic device 200. Here, the electronic device 200 can provide an interval for allowing a user to select (determine) whether or not to input payment information.

Figure 16B:
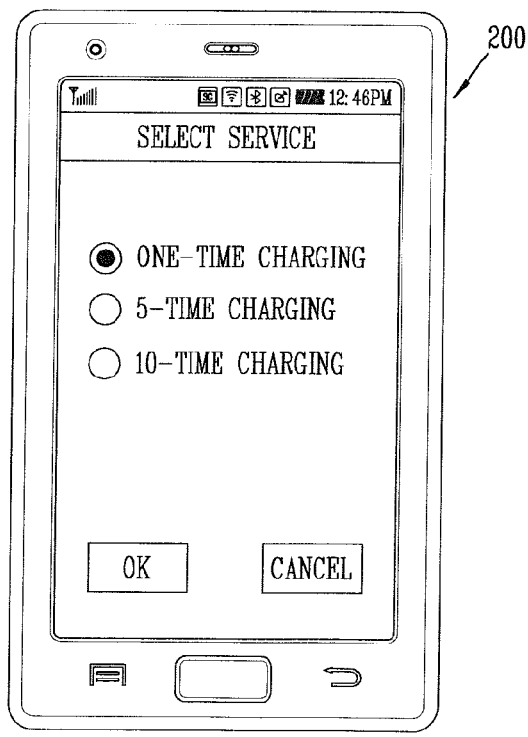

Referring to FIG. 16B, when the user selects (determines) to input the payment information, the electronic device 200 can receive a wireless charging service select request from the charging apparatus 100 and provide an interface for selecting a wireless charging service.

Figure 16C:
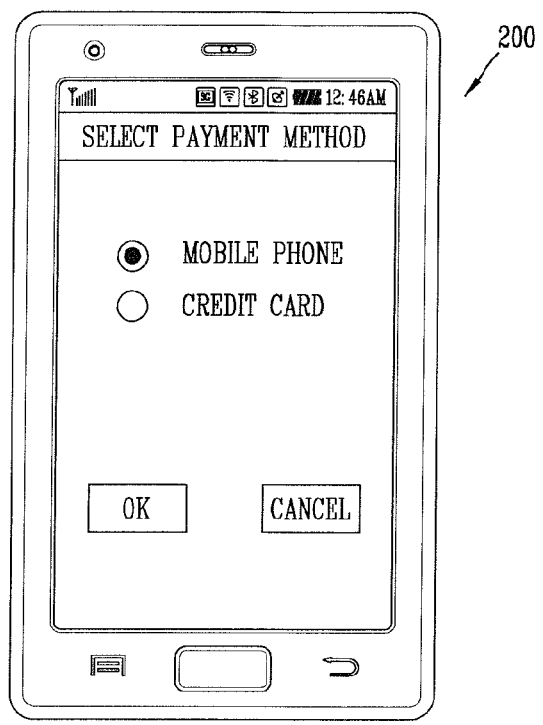

Referring to FIG. 16C, when the user selects the wireless charging service, the electronic device 200 can receive a payment method select request from the charging apparatus 100 and provide an interface for selecting a payment method.

Figure 16D:
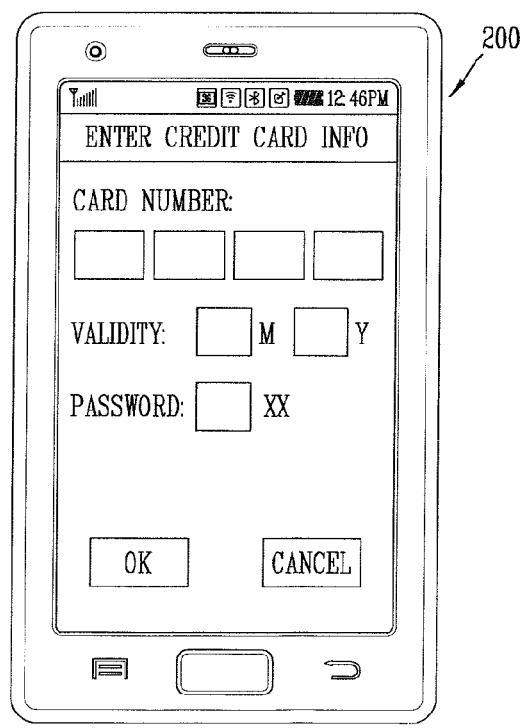

Referring to FIG. 16D, when the user selects the payment method, the electronic device 200 can receive a request for inputting detailed information relating to the corresponding payment method from the charging apparatus 100 and provide an interface for inputting the detailed information relating to the corresponding payment method.

When the user inputs the detailed information of the corresponding payment method, the wireless communication unit 210 of the electronic device 200 can transmit the input detailed information to the server 300. The controller 320 of the server 300 can then determine whether or not the payment information is valid and generate payment approval information based upon the determination result. The communication unit 310 of the server 300 can transmit the payment approval information to the electronic device 200.

Figure 16E:
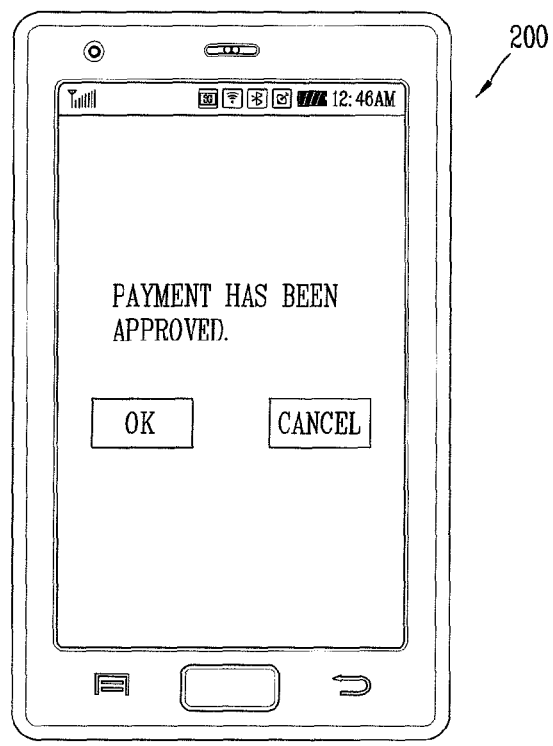
Figure 16F:
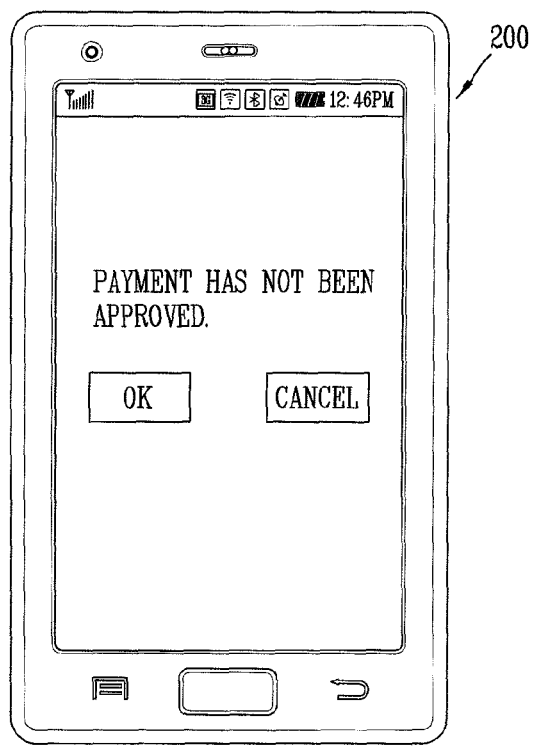

Referring to FIGS. 16E and 16F, the display unit 251 of the electronic device 200 can display the payment approval information received from the server 300. When the payment approval information indicates a successful approval, a message indicating that the payment has been approved can be displayed on the display unit 251 as shown in FIG. 16E. When the payment approval information indicates an unsuccessful approval, a message indicating that the payment has not been approved can be displayed on the display unit 251 as shown in FIG. 16F.

FIG. 17 is an overview showing wireless charging service areas in accordance with embodiments.

On the other hand, an region to which the wireless power signal can be approached can be divided into two types. First, active area denotes a region through which a wireless power signal transferring power to the electronic device 200 is passed. Next, semi-active area denotes a region of interest in which the charging apparatus 100 can detect the existence of the electronic device 200. The semi-active area may also be called as semi-charging area, considering the case where the charging apparatus 100 is transferring a power to the electronic device 200 for charging. Here, the controller 160 can detect whether the electronic device 200 is placed in the active area or semi-active area or removed from the area. Specifically, the controller 160 can detect whether or not the electronic device 200 is placed in the active area or semi-active area using a wireless power signal formed from the charging unit 110 or 120 or a sensor separately provided therein. For instance, the controller 160 can detect the presence of the electronic device 200 by monitoring whether or not the characteristic of power for forming the wireless power signal is changed by the wireless power signal, which is affected by the electronic device 200 existing in the semi-active area. However, the active area and semi-active area can vary according to the wireless power transfer method such as an inductive coupling method, a resonance coupling method, and the like. For example, the charging apparatus 100 can interact with the electronic device 200 placed in the semi-active area, performing various process such as an analog ping, a digital ping, and an identification/configuration process, which will be described in other part of this document. Wireless charging service areas in accordance with the embodiments can include an active area A, a semi-active area B and a non-active area C. The areas A, B and C are divided by each preset distance based upon the center of the charging unit 110 or 120 of the charging apparatus 100. Here, the areas A and B can be wireless charging service available areas, and the area C can be a wireless charging service unavailable area.

The electronic device 200 located within the area C cannot receive a packet from the charging unit 110 or 120 of the charging apparatus 100 via the power supply unit 290. Also, the electronic device 200 located within the area B can receive a packet from the charging unit 110 or 120 of the charging apparatus 100 via the power supply unit 290. However, the electronic device 200 within the area B can not receive power in a wireless manner or exhibit power reception efficiency lower than a threshold value. The electronic device 200 located within the area A can receive a packet from the charging unit 110 or 120 of the charging apparatus 100 via the power supply unit 290, wirelessly receive power and exhibit the power reception efficiency higher than the threshold value.

Figure 17A:
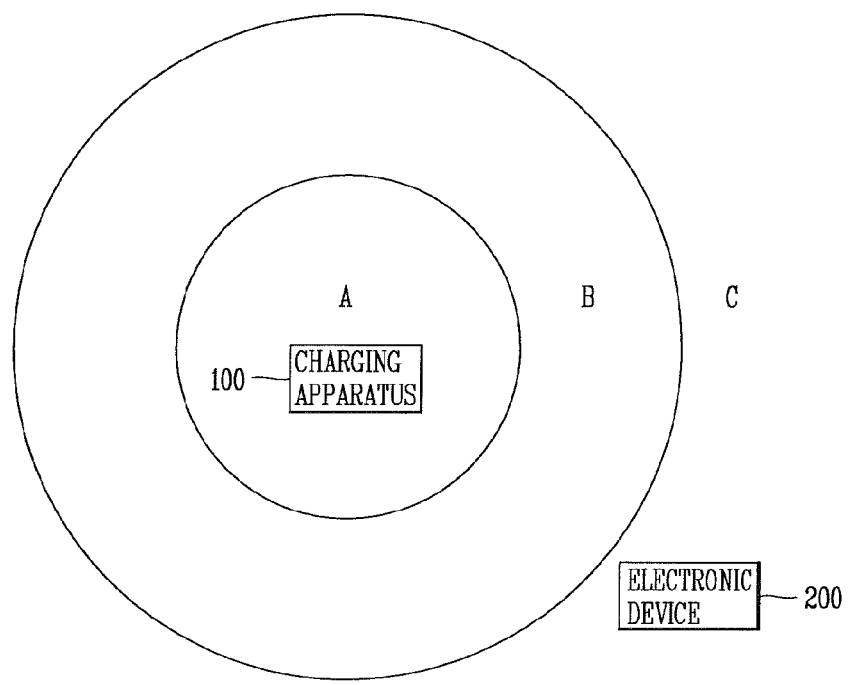
FIGS. 17A to 17C are overviews showing wireless charging service areas in accordance with the embodiments.

Referring to FIG. 17A, when the electronic device 200 is located within the area C, the charging unit 110 or 120 of the charging apparatus 100 can not receive a response packet from the electronic device 200 even if performing a digital ping to the electronic device 200, so it cannot recognize the presence of the electronic device 200.

The communication unit 150 of the charging apparatus 100 can separately receive identification information from the electronic device 200 via a data channel. However, because it corresponds to the electronic device 200 being located within the wireless charging service unavailable area, the charging apparatus 100 can not request an authentication of the electronic device 200 from the server 300.

Figure 17B:
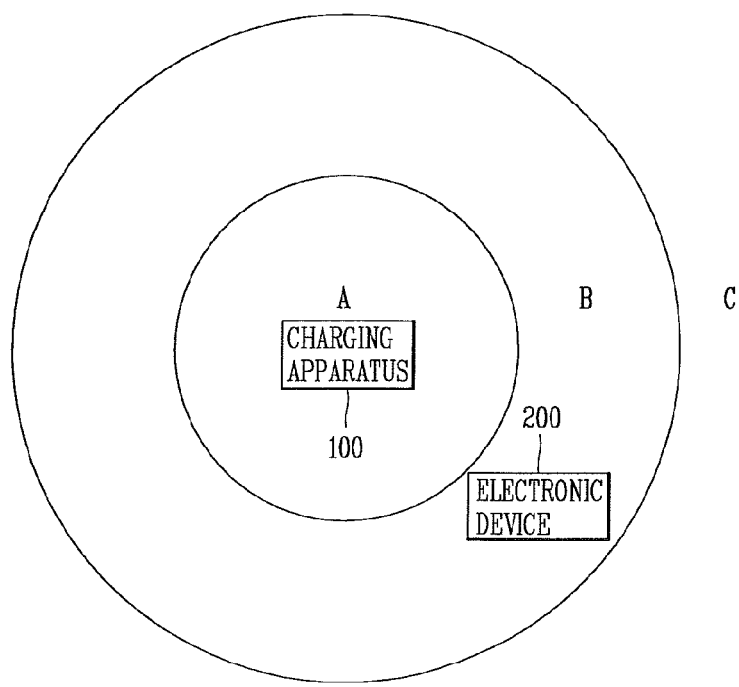

Referring to FIG. 17B, when the electronic device 200 is located within the area B, the charging unit 100 or 120 of the charging apparatus 100 can receive a response packet from the electronic device 200 by performing a digital ping to the electronic device 200 and accordingly receive identification information and configuration information related to the electronic device 200. Here, the charging apparatus 100 can request the authentication of the electronic device 200 from the server 300 and receive authentication result information from the server 300. However, even if the authentication result information indicates a successful authentication, since the area B is not allowed for wireless power transmission or the electronic device 200 within the area B exhibits lower power reception efficiency than a threshold value, the charging apparatus 100 cannot wirelessly transmit power to the electronic device 200.

Also, here, the communication unit 150 of the charging apparatus 100 can receive separate identification information from the electronic device 200 via a data channel. Since the electronic device 200 is located within the wireless charging service available area, the charging apparatus 100 can request the authentication of the electronic device 200 from the server 300.

Figure 17C:
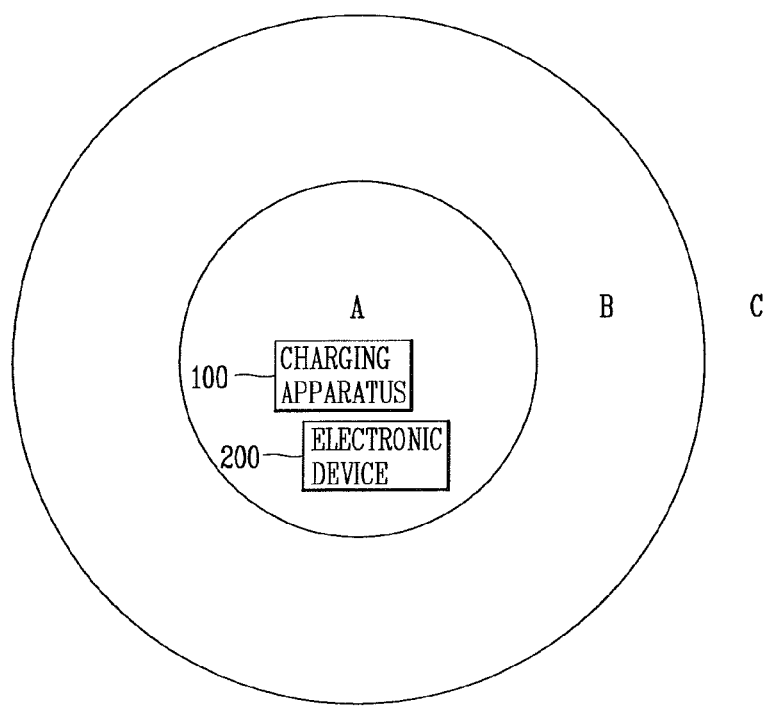

Referring to FIG. 17C, when the electronic device 200 is located within the area A, the charging unit 110 or 120 of the charging apparatus 100 can receive a response packet from the electronic device 200 by performing a digital pin to the electronic device 200, and accordingly receive identification information and configuration information related to the electronic device 200. Here, the charging apparatus 100 can request the authentication of the electronic device 200 from the server 300 and receive authentication result information from the server 300. Also, if the authentication result information indicates a successful authentication, since the area A is allowed for wireless power transmission and the electronic device 200 within the area A exhibits higher power reception efficiency than the threshold value, the charging apparatus 100 can wirelessly transmit power to the electronic device 200.

Also, the communication unit 150 of the charging apparatus 100 can receive separate identification information from the electronic device 200 via a data channel. Since the electronic device 200 is located within the wireless charging service available area, the charging apparatus 100 can request the authentication of the electronic device 200 from the server 300.

Figures 18, 19:
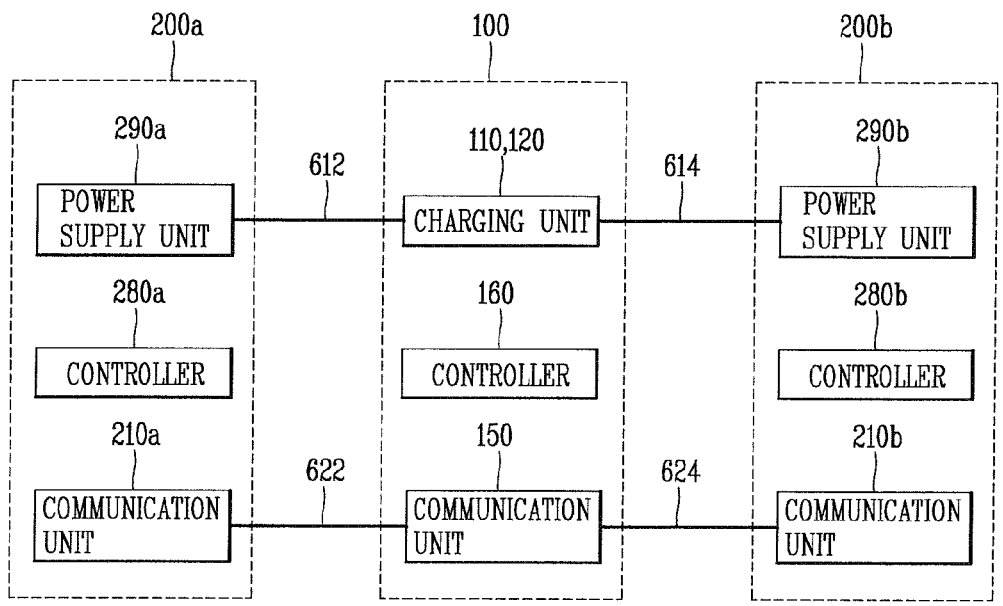
FIG. 18 is an overview showing a wireless charging system in accordance with another embodiment.
FIG. 19 is an overview showing power information about an electronic device 200 in accordance with another embodiment.

FIG. 18 is an overview showing a wireless charging system in accordance with another embodiment.

A wireless charging system in accordance with another embodiment can include a charging apparatus 100, a first electronic device 200a and a second electronic device 200b.

The charging apparatus 100 can include a charging unit 110 or 120, a communication unit 150 and a controller 160.

The charging unit 110 or 120 can wirelessly transmit power to the first or second electronic device 200a or 200b via a power channel 612 or 614.

The communication unit 150 can receive power information from each of the first electronic devices 200a and 200b via the data channels 622 and 624. The power information can include at least one of power state information and power control information related to the corresponding electronic device, and details of the power information can be described with reference to FIG. 19.

The controller 160 can decide one of the first and second electronic device 200a and 200b as a target electronic device based upon the power information related to each of the first and second electronic device 200a and 200b. Also, the controller 160 can control the charging unit 110 or 120 to wirelessly transmit power to the target electronic device.

Description of the components 210a, 280a and 290a of the first electronic device 200a and the components 210b, 280b and 290b of the second electronic device 200b is the same as the description of the components 210, 280 and 290 of the electronic device 200 shown in FIG. 12, so detailed description thereof will be omitted.

FIG. 19 is an overview showing power information of an electronic device 200 in accordance with another embodiment.

Power information related to an electronic device 200, as aforementioned, can include at least one of power state information and power control information related to the electronic device 200. The power state information related to the electronic device 200 can include at least one of power residual ratio and wireless data traffic (wireless data transmission and reception amount) both related to the electronic device 200. Also, the power state information related to the electronic device 200 can further include a minimum power requirement ratio used for wireless communication of the electronic device 200.

The power control information related to the electronic device 200 can be a set value indicating whether or not the charging of the electronic device 200 is urgent, namely, indicate urgent or normal. As such, the power control information can be set in the electronic device 200 by a user.

Referring to FIG. 19, the communication unit 150 can receive power information from each of the first and second electronic devices 200a and 200b, and the controller 160 can decide an electronic device, to which power is to be transmitted wirelessly, based upon the received power information.

For example, the first electronic device 200a can have 11% power residual ratio (current charge amount/total available charge amount) and 10% minimum power requirement ratio used for wireless communication (minimum charge amount used for wireless communication/total available charge amount). Also, the second electronic device 200b can have 19% power residual ratio and 20% minimum power requirement ratio used for wireless communication.

The controller 160 can decide charging priorities based upon a reference value, which is obtained by dividing the power residual ratio for each electronic device by the minimum power requirement ratio used for wireless communication. In one example, the first electronic device 200a has 11/10 as a reference value and the second electronic device 200b has 19/20 as a reference value. In this example, the controller 160 can decide the second electronic device 200b having the lower reference value as a target electronic device. In another example, if the reference values of the first and second electronic devices 200a and 200b are all greater than 1, the controller 160 can decide an electronic device, which has first entered a wireless charging service area, as a target electronic device.

For example, it is assumed that the wireless data traffic (i.e., the recent wireless data traffic per unit time as of the present time) of the first electronic device 200a is 30 mb/day, and the wireless data traffic of the second electronic device 200b is 50 mb/day.

Here, the controller 160 can decide charging priorities by setting the wireless data traffic as reference values. In one example, the first electronic device 200a has the value of 30 as the reference value, and the second electronic device 200b has the value of 50 as the reference value. Here, the controller 160 can decide the second electronic device 200b having the higher reference value as a target electronic device.

Also, for example, it is assumed that whether or not to charge urgently is set to "urgent" with respect to the first electronic device 200a and "normal" with respect to the second electronic device 200b.

Here, the controller 160 can decide charging priorities by setting the urgent charging or normal charging as reference values. In one example, the controller 160 can decide the first electronic device 200a, which is set to "urgent" as to whether or not to charge urgently, as a target electronic device.

Figure 20:
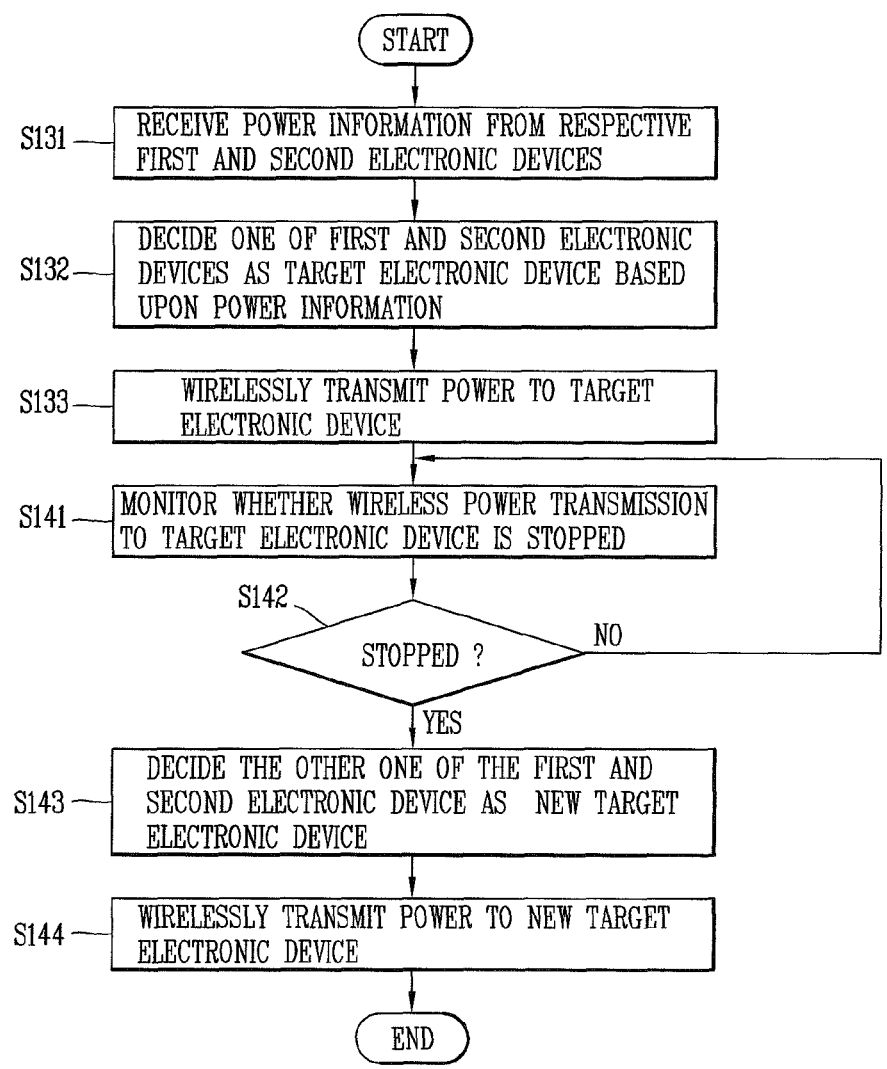
FIG. 20 is a flowchart showing an operation control process of a wireless charging system in accordance with another embodiment.

FIG. 20 is a flowchart showing an operation control process of a wireless charging system in accordance with another embodiment.

The communication unit 150 can receive power information from each of the first and second electronic devices 200a and 200b (S131).

The controller 160 can decide one of the first and second electronic devices 200a and 200b as a target electronic device based upon the power information (S132).

The charging unit 110 or 120 can wirelessly transmit power to the target electronic device (S133).

Also, the controller 160 can monitor whether or not the wireless power transmission from the charging unit 110 or 120 to the target electronic device is stopped (S141). For example, the controller 160 can monitor whether the charging unit 110 or 120 receives a message indicating that the charging has been completed from the target electronic device or a message indicating that an error has occurred during charging from the target electronic device.

If it is monitored that the wireless power transmission to the target electronic device has been stopped (S142), the controller 160 can decide an electronic device, which has not been decided as the target electronic device at the step S132, of the first and second electronic devices 200a and 200b, as a new target electronic device (S143).

The charging unit 110 or 120 can wirelessly transmit power to the new target electronic device (S144).

The wireless charging apparatus disclosed in this specification can provide a wireless charging service to an authenticated electronic device, such that a user can get the wireless charging service more stably. Also, the priorities for the wireless charging service can be controlled based upon power information, such that the user can get the wireless charging service more efficiently.

The aforementioned method can be implemented in a recording medium readable by a computer or other similar devices using software, hardware or combination thereof.

For a hardware implementation, the embodiments described herein can be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some instances, such embodiments are implemented by the controller 160 of the charging apparatus 100, or implemented by the controller 280 of the mobile electronic device 200 or the multimedia device 200'.

For software implementation, the embodiments such as procedures and functions can be implemented together with separate software modules each of which performs at least one of functions and operations. The software codes can be implemented with a software application written in any suitable programming language. Also, the software codes can be stored in the memory 260 and executed by the controller 280.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the embodiments described herein can be combined in various ways to obtain additional and/or alternative embodiments.

As the present features can be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A wireless charging apparatus comprising:
   a wireless communication unit configured to receive authentication result information relating to a target electronic device from a database;
   a controller configured to choose one of a plurality of electronic devices as the target electronic device based upon power information relating to respective electronic devices; and
   a wireless charging unit configured to wirelessly transmit power to the target electronic device when the authentication result information indicates a successful authentication, and transmit the authentication result information to the target electronic device when the authentication result information indicates an unsuccessful authentication, wherein the power information comprises of power state information and power control information related to an associated electronic device, wherein the power state information comprises power residual information and minimum power requirement information for wireless communication, both related to the associated electronic device, and wherein the power control information is related to urgent charging or non-urgent charging of the associated electronic device.

2. The apparatus of claim 1, wherein the wireless communication unit receives identification information from the target electronic device and requests the authentication result information from the database based upon the identification information.

3. The apparatus of claim 1, wherein the wireless charging unit receives identification information from the target electronic device, wherein the wireless communication unit requests the authentication result information from the database based upon the identification information.

4. The apparatus of claim 1, wherein the wireless communication unit requests payment information from the target electronic device.

5. The apparatus of claim 4, wherein the wireless communication unit receives the requested payment information from the target electronic device and transmits the received payment information to the database.

6. The apparatus of claim 5, wherein the wireless communication unit receives approval information in response to the payment information from the database and transmits the received approval information to the target electronic device.

7. The apparatus of claim 1, wherein the wireless communication unit receives account information related to the target electronic device from the database, and wherein the wireless charging unit wirelessly transmits power to the target electronic device based upon the received account information.

8. The apparatus of claim 1, wherein the wireless communication unit receives the authentication result information related to the target electronic device from the database when the target electronic device is located within an area allowing wireless power reception.

9. The apparatus of claim 1, wherein the wireless communication unit receives the authentication result information related to the target electronic device from the database when the target electronic device is located within an area, the area not allowing wireless power reception.

10. The apparatus of claim 1, wherein the wireless communication unit receives the authentication result info niation related to the target electronic device from the database when the target electronic device is located within an area allowing a wireless data transmission and reception.

11. The apparatus of claim 1, wherein the wireless communication unit transmits information to the target electronic device to allow authentication after an unsuccessful authentication.

12. The apparatus of claim 11, wherein the information comprises a request for payment information.

* * * * *